US011443893B2

(12) United States Patent
Chiyo

(10) Patent No.: US 11,443,893 B2
(45) Date of Patent: Sep. 13, 2022

(54) COIL COMPONENT AND WIRELESS POWER TRANSMISSION CIRCUIT HAVING THE SAME

(71) Applicant: TDK Corporation, Tokyo (JP)

(72) Inventor: Noritaka Chiyo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/361,804

(22) Filed: Mar. 22, 2019

(65) Prior Publication Data

US 2019/0304670 A1    Oct. 3, 2019

(30) Foreign Application Priority Data

Mar. 31, 2018 (JP) .............................. JP2018-070450
Apr. 4, 2018 (JP) .............................. JP2018-072370

(51) Int. Cl.
*H02J 50/70* (2016.01)
*H01F 41/04* (2006.01)
(Continued)

(52) U.S. Cl.
CPC ......... *H01F 27/346* (2013.01); *H01F 27/245* (2013.01); *H01F 27/2804* (2013.01);
(Continued)

(58) Field of Classification Search
CPC .. H01F 27/346; H01F 27/245; H01F 27/2804; H01F 38/14; H01F 41/041; H02J 50/12; H02J 50/70
(Continued)

(56) References Cited

U.S. PATENT DOCUMENTS

2009/0322458 A1    12/2009 Lee et al.
2011/0050380 A1    3/2011 Nakanishi
(Continued)

FOREIGN PATENT DOCUMENTS

EP    1 085 538 A1    3/2001
JP    H11-040438 A    2/1999
(Continued)

OTHER PUBLICATIONS

Japanese Notice of Reasons for Refusal issued in corresponding Japanese Patent Application No. 2018-070450, dated Nov. 16, 2021, with English translation.
(Continued)

*Primary Examiner* — Michael R. Fin
(74) *Attorney, Agent, or Firm* — McDermott Will & Emery LLP

(57) ABSTRACT

Disclosed herein is a coil component that includes a coil pattern spirally wound in a plurality of turns. The coil pattern has an innermost turn positioned at an innermost periphery, an outermost turn positioned at an outermost periphery, a middle turn whose turn number counted from the innermost or outermost turn is intermediate among all the turns, and a center position of a line length. The coil pattern is designed such that a pattern width at the center position is larger than pattern widths of the innermost and outermost turns, and that a total or average value of pattern widths of turns positioned between the outermost turn and the middle turn is larger than a total or average value of pattern widths of turns positioned between the innermost turn and the middle turn.

54 Claims, 27 Drawing Sheets

(51) Int. Cl.
  *H02J 50/12* (2016.01)
  *H01F 27/245* (2006.01)
  *H01F 27/28* (2006.01)
  *H01F 27/34* (2006.01)
  *H01F 38/14* (2006.01)

(52) U.S. Cl.
  CPC .......... *H01F 38/14* (2013.01); *H01F 41/041* (2013.01); *H02J 50/12* (2016.02); *H02J 50/70* (2016.02)

(58) Field of Classification Search
  USPC ........................................................ 307/104
  See application file for complete search history.

(56) References Cited

U.S. PATENT DOCUMENTS

| | | | | |
|---|---|---|---|---|
| 2014/0375262 A1* | 12/2014 | Yamaguchi | ............. | H01F 38/14 320/108 |
| 2015/0077296 A1* | 3/2015 | An | ........................ | H01Q 1/2225 343/720 |
| 2016/0254842 A1* | 9/2016 | Hong | ................... | H04B 5/0081 343/867 |
| 2017/0278619 A1* | 9/2017 | Lee | ......................... | H02J 50/10 |
| 2018/0205132 A1* | 7/2018 | Lee | ...................... | H04B 5/0081 |
| 2018/0323494 A1* | 11/2018 | Seong | ....................... | H01F 1/37 |
| 2018/0358168 A1 | 12/2018 | Furiya et al. | | |

FOREIGN PATENT DOCUMENTS

| | | |
|---|---|---|
| JP | 2003-017322 A | 1/2003 |
| JP | 2008-205215 A | 9/2008 |
| JP | 2010-056175 A | 3/2010 |
| JP | 2013-225718 A | 10/2013 |
| JP | 2016-093087 A | 5/2016 |
| JP | 2016-093088 A | 5/2016 |
| JP | 2019-041273 A | 3/2019 |

OTHER PUBLICATIONS

Japanese Notice of Reasons for Refusal issued in corresponding Japanese Patent Application No. 2018-072370, dated Dec. 14, 2021, with English Translation.

* cited by examiner

| EXAMPLE 1 | PATTERN WIDTH [mm] | PATTERN THICKNESS [mm] | SPACE [mm] |
|---|---|---|---|
| turn 1 | 0.35 | 0.100 | 0.15 |
| turn 2 | 0.48 | 0.100 | 0.15 |
| turn 3 | 0.57 | 0.100 | 0.15 |
| turn 4 | 0.64 | 0.100 | 0.15 |
| turn 5 | 0.68 | 0.095 | 0.15 |
| turn 6 | 0.70 | 0.095 | 0.15 |
| turn 7 | 0.70 | 0.095 | 0.15 |
| turn 8 | 0.69 | 0.095 | 0.15 |
| turn 9 | 0.67 | 0.090 | 0.15 |
| turn 10 | 0.64 | 0.090 | 0.15 |
| turn 11 | 0.61 | 0.090 | 0.15 |
| turn 12 | 0.57 | 0.090 | 0.15 |
| turn 13 | 0.53 | 0.085 | 0.15 |
| turn 14 | 0.48 | 0.085 | 0.15 |
| turn 15 | 0.45 | 0.085 | 0.15 |
| turn 16 | 0.39 | 0.080 | 0.15 |
| turn 17 | 0.36 | 0.080 | 0.15 |
| turn 18 | 0.33 | 0.080 | 0.15 |
| turn 19 | 0.30 | 0.080 | 0.15 |
| turn 20 | 0.28 | 0.080 | 0.15 |

| EXAMPLE 2 | PATTERN WIDTH [mm] | PATTERN THICKNESS [mm] | SPACE [mm] |
|---|---|---|---|
| turn 1 | 0.35 | 0.100 | 0.23 |
| turn 2 | 0.48 | 0.100 | 0.16 |
| turn 3 | 0.50 | 0.100 | 0.15 |
| turn 4 | 0.50 | 0.100 | 0.15 |
| turn 5 | 0.50 | 0.095 | 0.15 |
| turn 6 | 0.50 | 0.095 | 0.15 |
| turn 7 | 0.50 | 0.095 | 0.15 |
| turn 8 | 0.50 | 0.095 | 0.15 |
| turn 9 | 0.50 | 0.090 | 0.15 |
| turn 10 | 0.50 | 0.090 | 0.15 |
| turn 11 | 0.50 | 0.090 | 0.15 |
| turn 12 | 0.50 | 0.090 | 0.15 |
| turn 13 | 0.50 | 0.085 | 0.16 |
| turn 14 | 0.48 | 0.085 | 0.19 |
| turn 15 | 0.45 | 0.085 | 0.23 |
| turn 16 | 0.39 | 0.080 | 0.27 |
| turn 17 | 0.36 | 0.080 | 0.29 |
| turn 18 | 0.34 | 0.080 | 0.30 |
| turn 19 | 0.34 | 0.080 | 0.30 |
| turn 20 | | | |

| COMPARATIVE EXAMPLE | PATTERN WIDTH [mm] | PATTERN THICKNESS [mm] | SPACE [mm] |
|---|---|---|---|
| turn 1 | 0.50 | 0.090 | 0.15 |
| turn 2 | 0.50 | 0.090 | 0.15 |
| turn 3 | 0.50 | 0.090 | 0.15 |
| turn 4 | 0.50 | 0.090 | 0.15 |
| turn 5 | 0.50 | 0.090 | 0.15 |
| turn 6 | 0.50 | 0.090 | 0.15 |
| turn 7 | 0.50 | 0.090 | 0.15 |
| turn 8 | 0.50 | 0.090 | 0.15 |
| turn 9 | 0.50 | 0.090 | 0.15 |
| turn 10 | 0.50 | 0.090 | 0.15 |
| turn 11 | 0.50 | 0.090 | 0.15 |
| turn 12 | 0.50 | 0.090 | 0.15 |
| turn 13 | 0.50 | 0.090 | 0.15 |
| turn 14 | 0.50 | 0.090 | 0.15 |
| turn 15 | 0.50 | 0.090 | 0.15 |
| turn 16 | 0.50 | 0.090 | 0.15 |
| turn 17 | 0.50 | 0.090 | 0.15 |
| turn 18 | 0.50 | 0.090 | 0.15 |
| turn 19 | 0.50 | 0.090 | 0.15 |
| turn 20 | 0.50 | 0.090 | |

FIG. 31

|  | RESISTANCE [Ω] | INDUCTANCE [μH] |
| --- | --- | --- |
| EXAMPLE 1 | 0.161 | 7.4 |
| EXAMPLE 2 | 0.188 | 8.0 |
| COMPARATIVE EXAMPLE | 0.231 | 8.0 |

FIG. 32

COIL COMPONENT AND WIRELESS POWER TRANSMISSION CIRCUIT HAVING THE SAME

BACKGROUND OF THE INVENTION

Field of the Invention

The present invention relates to a coil component and, more particularly, to a coil component having a spiral-shaped planar conductor. The present invention also relates to a wireless power transmission circuit using such a coil component.

Description of Related Art

As coil components used in various electronic devices, there are known coil components of a type obtained by winding a wire (coated conductive wire) around a magnetic core and coil components of a type obtained by forming a plurality of turns of a spiral-shaped planar conductor on the surface of a substrate. For example, JP H11-040438 A discloses a coil component having a configuration in which a spiral-shaped planar conductor is wound in a plurality of turns, and the width of a coil pattern of several turns on each of the inner and outer peripheral sides is made narrower. The coil pattern positioned on each of the inner and outer peripheral sides is strongly affected by a magnetic field, so that by reducing the pattern width at this portion as described in JP H11-040438 A, it is possible to reduce loss due to the influence of a magnetic field.

In JP H11-040438 A, the coil pattern width is made symmetrical on both the inner and outer peripheral sides. That is, the pattern width of an n-th turn from the innermost periphery and the pattern width of an n-th turn from the outermost periphery are the same.

However, the intensity of the magnetic field differs between the inner and outer peripheral sides of the coil pattern; therefore, loss cannot be sufficiently reduced only by homogenizing the coil pattern width between the inner and outer peripheral sides. This poses a problem that, particularly, AC resistance cannot be reduced sufficiently.

In recent years, a wireless power transmission system that transmits power without use of a power cable or a power cord is attracting attention. The wireless power transmission system enables power to be supplied from a power transmission side to a power receiving side by wireless, and is thus expected to be applied to various products such as transport equipment (electric trains, electric cars), home electric appliances, electronic devices, wireless communication devices, toys, and industrial equipment. A transmitting coil and a receiving coil are used in the wireless power transmission system, and by interlinking magnetic flux generated by the transmitting coil with the receiving coil, power is transmitted by wireless.

As a coil component for the wireless power transmission system, JP 2016-93088 A and JP 2008-205215 A disclose a coil component having a configuration in which a plurality of planar spiral-shaped coil patterns are connected in parallel. Connecting a plurality of coil patterns in parallel allows a larger current to flow in the transmitting coil and receiving coil, thus making it possible to increase power to be transmitted by wireless.

However, in the coil component described in JP 2016-93088 A and JP 2008-205215 A, the plurality of coil patterns connected in parallel have substantially the same shape, so that a difference occurs in impedance among the respective coil patterns due to a difference in inductance according to a distance from a magnetic sheet, posing a problem that loss is increased due to inhomogeneous current density distribution caused by the difference in impedance.

Regarding this, JP 2016-93088 A proposes a method of forming a first coil unit by connecting in series a coil pattern closest to a magnetic sheet and a coil pattern farthest from the magnetic sheet, forming a second coil unit by connecting in series a coil pattern second closest to the magnetic sheet and a coil pattern second farthest from the magnetic sheet, and connecting in parallel the first and second coil units so as to balance the impedance between the first and second coil units. However, in this method, the impedances of the respective first and second coil units do not always coincide with each other depending on the positional relationship between the magnetic sheet and the coil patterns.

Similarly, J P 2008-205215 A discloses a configuration connecting in series two coil patterns to form one coil unit and connecting in parallel two coil units. However, it is difficult to make the impedances of the two coil units coincide with each other only by changing a combination of two coil patterns constituting the coil unit, posing a problem that loss is increased due to deviation of current caused by the difference in impedance.

Further, in the coil component described in JP 2016-93088 A and JP 2008-205215 A, four or more coil patterns need to be provided and, when three or less coils are connected in parallel, the impedances cannot be balanced.

SUMMARY

An object of the present invention is therefore to provide a coil component capable of effectively reducing losses caused by magnetic fields and thus of further reducing AC resistance and a wireless power transmission circuit having the coil component.

Another object of the present invention is therefore to provide a coil component constituted of two or more parallel-connected coil patterns and capable of further reducing a difference in impedance due to a distance from the magnetic sheet.

A coil component according to one aspect of the present invention includes a substrate and a first coil pattern formed on one surface of the substrate and spirally wound in a plurality of turns. The first coil pattern has an innermost turn positioned at the innermost periphery, an outermost turn positioned at the outermost periphery, a middle turn whose turn number counted from the innermost or outermost turn is intermediate among all the turns, and a center position of a line length. The first coil pattern is designed such that the pattern width at the center position is larger than the pattern widths of the respective innermost and outermost turns and that the total or average value of the pattern widths of the turns positioned between the outermost turn and the middle turn is larger than the total or average value of the pattern widths of the turns positioned between the innermost turn and the middle turn.

According to the present invention, the pattern widths of the respective innermost and outermost turns are reduced, so that loss due to the influence of a magnetic field can be reduced. In addition, the total or average value of the pattern widths of the turns positioned between the outermost turn and the middle turn is larger than the total or average value of the pattern widths of the turns positioned between the innermost turn and the middle turn, so that loss on the inner peripheral side which is more strongly affected by a magnetic field is reduced further. Therefore, as compared to a case where the pattern width of the coil pattern is made symmetrical on both the inner and outer peripheral sides, AC resistance can be further reduced without reduction in the pattern width more than necessary.

In the present invention, the pattern width at the center position may be larger than the pattern width of the middle turn. This means that the pattern width of a portion less affected by a magnetic field is increased, so that it is possible to reduce DC resistance while reducing loss due to the influence of a magnetic field.

In the present invention, the pattern width of the innermost turn may be smaller than that of the outermost turn. This allows loss at the innermost turn that is most strongly affected by a magnetic field to be reduced further.

In the present invention, the dimension of a space between radially adjacent turns may be constant. With this configuration, a sufficient pattern width can be ensured, thereby making it possible to reduce DC resistance.

In the present invention, a radial pitch between the plurality of turns may be constant. With this configuration, it is possible to obtain the same inductance as obtained when the pattern width is constant.

In the present invention, the pattern width of the innermost turn may be larger than the pattern thickness of the first coil pattern. This configuration makes it possible to obtain a remarkable loss reduction effect resulting from a reduction in the pattern width of the innermost turn.

In the present invention, the pattern thickness of the innermost turn may be smaller than that of the outermost turn. In this case as well, it is possible to obtain a remarkable loss reduction effect obtained by reducing the pattern width of the innermost turn.

In the present invention, the turns constituting the first coil pattern may each be constituted of a plurality of conductive patterns radially divided by spiral-shaped slits, including first and second conductive patterns. With this configuration, inhomogeneous current density distribution is reduced, allowing reduction in DC resistance and AC resistance.

The coil component according to the present invention may further include a second coil pattern formed on the other surface of the substrate and spirally wound in a plurality of turns. The inner peripheral end of the first coil pattern and that of the second coil pattern may be connected to each other. The second coil pattern may have an innermost turn positioned at the innermost periphery, an outermost turn positioned at the outermost periphery, a middle turn whose turn number counted from the innermost or outermost turn is intermediate among all the turns, and a center position of the line length. The second coil pattern may be designed such that the pattern width at the center position is larger than the pattern widths of the respective innermost and outermost turns and that the total or average value of the pattern widths of the turns positioned between the outermost turn and the middle turn is larger than the total or average value of the pattern widths of the turns positioned between the innermost turn and the middle turn. With this configuration, the coil patterns are formed on both surfaces of the substrate, respectively, so that a total number of turns can be increased.

In the present invention, the turns constituting the second coil pattern may each be constituted of a plurality of conductive patterns radially divided by spiral-shaped slits, including third and fourth conductive patterns. The first conductive pattern may be positioned on the outer peripheral side relative to the second conductive pattern, the third conductive pattern may be positioned on the outer peripheral side relative to the fourth conductive pattern, the inner peripheral end of the first conductive pattern and that of the fourth conductive pattern may be connected to each other, and the inner peripheral end of the second conductive pattern and that of the third conductive pattern may be connected to each other. With this configuration, current density distribution becomes more homogenous between the conductive patterns positioned on the inner and outer peripheral sides, allowing further reduction in DC resistance and AC resistance.

The coil component according to the present invention may further include a magnetic sheet disposed so as to overlap the first coil pattern in a plan view. This can increase inductance.

A wireless power transmission circuit according to the present invention includes the above-described coil component and a resonance circuit connected to the coil component. The pattern thickness of the first coil pattern is smaller than the skin depth of current flowing in the first coil pattern at a resonance frequency. According to the present invention, the pattern thickness of the first coil pattern is smaller than the skin depth, so that loss reduction effect obtained by reducing the pattern widths of the respective innermost and outermost turns becomes remarkable, whereby it is possible to suitably use the coil component as a transmitting circuit or a receiving circuit of the wireless power transmission system.

A coil component according to another aspect of the present invention includes a magnetic sheet and first and second coil patterns which are each spirally wound in a plurality of turns and which are disposed so as to overlap the magnetic sheet in a plan view. The first and second coil patterns are connected in parallel. The first coil pattern is disposed closer to the magnetic sheet than the second coil pattern. The line length of the second coil pattern is larger than that of the first coil pattern.

According to the present invention, a difference in the line length is set between the first and second coil patterns, thereby allowing fine adjustment of the impedance of the individual coil patterns. Thus, it is possible to further reduce the difference in impedance between the first and second coil patterns to thereby reduce impedance difference in the entire coil component. As a result, loss due to the impedance difference can be reduced.

In the present invention, the inner diameter of the second coil pattern may be larger than that of the first coil pattern. With this configuration, the line length of the second coil pattern can be increased as much as the inner diameter of the second coil pattern is larger than that of the first coil pattern.

In the present invention, the outer diameter of the second coil pattern may be larger than that of the first coil pattern. With this configuration, the line length of the second coil pattern can be increased as much as the outer diameter of the second coil pattern is larger than that of the first coil pattern.

In the present invention, the number of turns of the first coil pattern and that of the second coil pattern may be equal to each other. In this case as well, by making the inner or outer diameter of the second coil pattern larger than that of the first coil pattern, the line length of the second coil pattern can be increased.

In the present invention, the number of turns of the second coil pattern may be larger than that of the first coil pattern. With this configuration, the line length of the second coil pattern can be increased correspondingly as much as the number of turns of the second coil pattern is larger than that of the first coil pattern.

In the present invention, the first and second coil patterns may each have an innermost turn positioned at the innermost periphery, an outermost turn positioned at the outermost periphery, a middle turn whose turn number counted from the innermost or outermost turn is intermediate among all the turns, and a center position of a line length. The first coil pattern may be designed such that the pattern width at the center position is larger than the pattern widths of the respective innermost and outermost turns and that the total or average value of the pattern widths of the turns positioned between the outermost turn and the middle turn is larger than the total or average value of the pattern widths of the turns positioned between the innermost turn and the middle turn. The second coil pattern may be designed such that the pattern width at the center position is larger than the pattern widths of the respective innermost and outermost turns and that the total or average value of the pattern widths of the turns positioned between the outermost turn and the middle turn is larger than the total or average value of the pattern widths of the turns positioned between the innermost turn and the middle turn. Thus, the pattern widths of the respective innermost and outermost turns are reduced, so that loss due to the influence of a magnetic field can be reduced. In addition, the total or average value of the pattern widths of the turns positioned between the outermost turn and the middle turn is larger than the total or average value of the pattern widths of the turns positioned between the innermost turn and the middle turn, so that loss on the inner peripheral side, which is more strongly affected by a magnetic field, is reduced further. Therefore, as compared to a case where the pattern widths of the coil pattern are made symmetrical on both the inner and outer peripheral sides, AC resistance can be further reduced.

In the present invention, the first coil pattern may be designed such that the pattern width at the center position is larger than that of the middle turn, and the second coil pattern may be designed such that the pattern width at the center position is larger than that of the middle turn. This indicates that the pattern width of a portion less affected by a magnetic field is increased, so that it is possible to reduce DC resistance while reducing loss due to the influence of a magnetic field.

In the present invention, the first coil pattern may be designed such that the pattern width of the innermost turn is smaller than that of the outermost turn, and the second coil pattern may be designed such that the pattern width of the innermost turn is smaller than that of the outermost turn. This allows loss at the innermost turn most strongly affected by a magnetic field to be reduced further.

The coil component according to the present invention may further include first and second substrates disposed so as to overlap the magnetic sheet in a plan view. The first coil pattern may be formed on one surface of the first substrate, and the second coil pattern may be formed on one surface of the second substrate. This allows two coil patterns having different line lengths to be formed on mutually different substrates.

The coil component according to the present invention may further include third and fourth coil patterns each spirally wound in a plurality of turns. The third coil pattern may be formed on the other surface of the first substrate, and the fourth coil pattern may be formed on the other surface of the second substrate. The inner peripheral end of the first coil pattern and that of the third coil pattern may be connected to each other, and the inner peripheral end of the second coil pattern and that of the fourth coil pattern may be connected to each other. The line length of the fourth coil pattern may be larger than that of the third coil pattern. With this configuration, a first coil unit is formed by the series-connected first and third coil patterns, and a second coil unit is formed by the series-connected second and fourth coil patterns and, further, a difference in inductance between the two coil units can be reduced.

In the present invention, the turns constituting the first coil pattern may each be constituted of a plurality of conductive patterns radially divided by spiral-shaped slits, including first and second conductive patterns, and the turns constituting the third coil pattern may each be constituted of a plurality of conductive patterns radially divided by spiral-shaped slits, including third and fourth conductive patterns. With this configuration, inhomogeneous current density distribution is reduced, allowing reduction in DC resistance and AC resistance.

In the present invention, the first conductive pattern may be positioned on the outer peripheral side relative to the second conductive pattern, and the third conductive pattern may be positioned on the outer peripheral side relative to the fourth conductive pattern. The inner peripheral end of the first conductive pattern and that of the fourth conductive pattern may be connected to each other, and the inner peripheral end of the second conductive pattern and that of the third conductive pattern may be connected to each other. With this configuration, current density distribution becomes more uniform between the conductive patterns positioned on the inner and outer peripheral sides, allowing further reduction in DC resistance and AC resistance.

As described above, according to one aspect of the present invention, loss due to the influence of a magnetic field can be reduced more effectively, so that it is possible to provide a coil component capable of further reducing AC resistance and a wireless power transmission circuit having the coil component.

The coil component according to another aspect of the present invention can further reduce a difference in impedance due to a distance from the magnetic sheet, allowing a coil component with small AC resistance loss to be provided. Thus, when the coil component according to the present invention is used as a receiving coil or transmitting coil of a wireless power transmission system, heat generation associated with power transmission can be reduced.

BRIEF DESCRIPTION OF THE DRAWINGS

The above features and advantages of the present invention will be more apparent from the following description of certain preferred embodiments taken in conjunction with the accompanying drawings, in which:

FIG. 31 is a table illustrating simulation conditions of each of Examples; and

FIG. 32 is a table illustrating simulation results of each of Examples.

DETAILED DESCRIPTION OF THE EMBODIMENTS

Hereinafter, preferred embodiments of the present invention will be described with reference to the accompanying drawings.

First Embodiment

Figure 1:
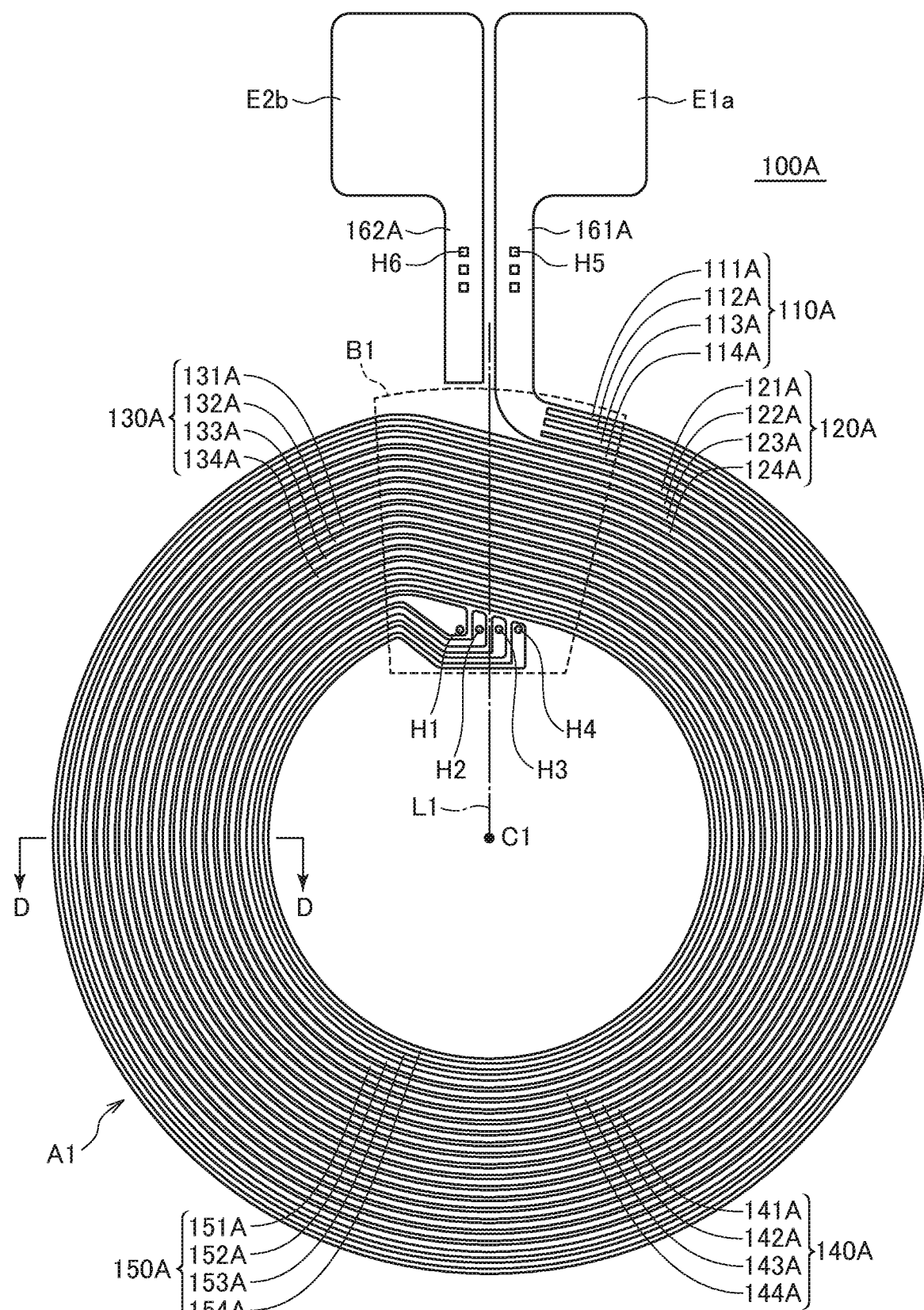
FIG. 1 is a schematic plan view for explaining the pattern shape of a first coil pattern 100A included in a coil component 1A according to a first embodiment of the present invention.
Figure 2:
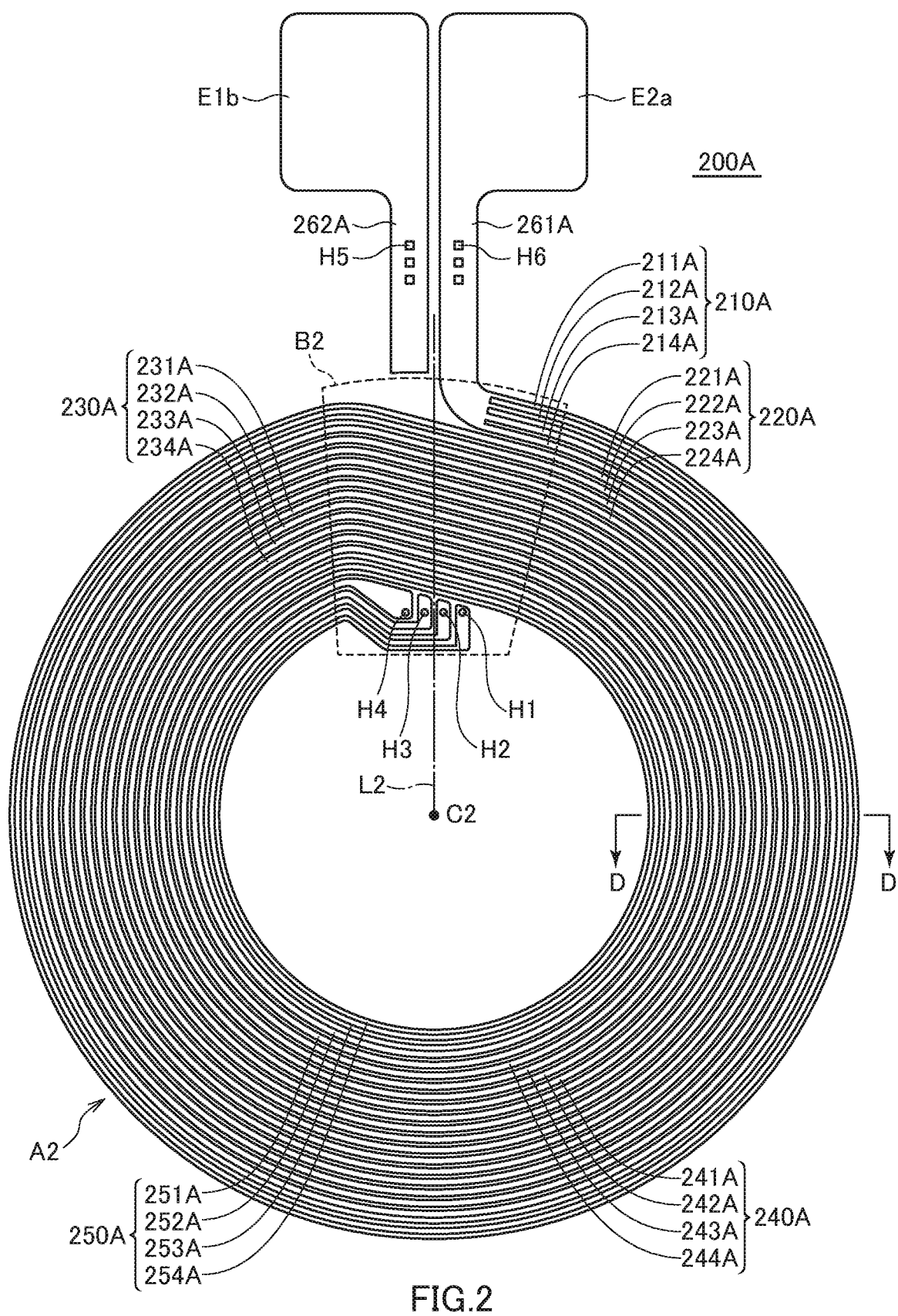
FIG. 2 is a schematic plan view for explaining the pattern shape of a second coil pattern 200A included in the coil component 1A according to the first embodiment of the present invention.
Figure 3:
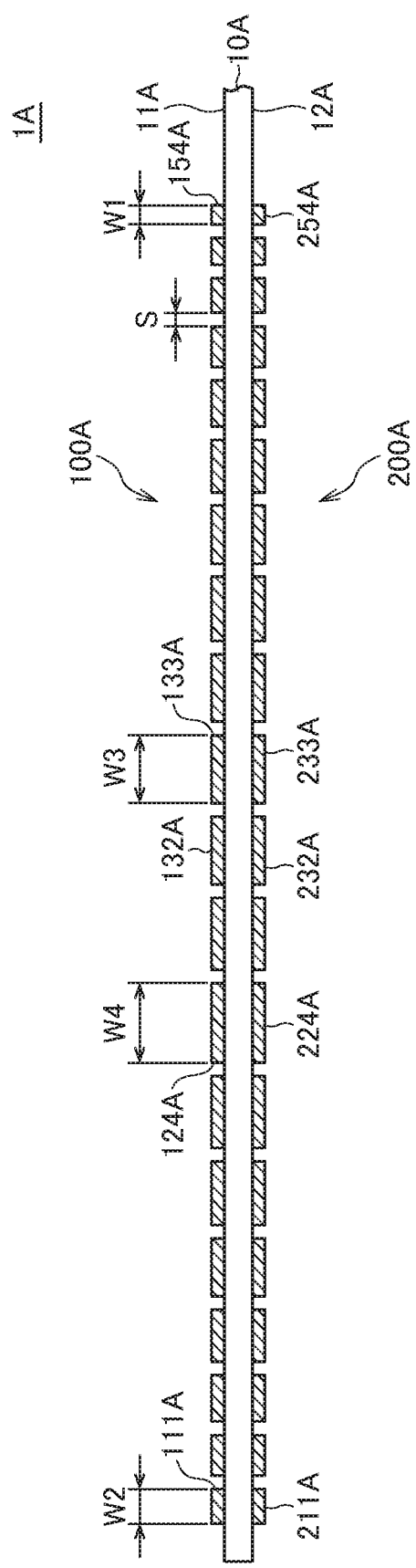
FIG. 3 is a schematic cross-sectional view taken along line D-D in FIGS. 1 and 2.

FIGS. 1 and 2 are schematic plan views for explaining pattern shapes of a first coil pattern 100A and a second coil pattern 200A, respectively, included in a coil component 1A according to the first embodiment of the present invention. FIG. 3 is a schematic cross-sectional view taken along line D-D in FIGS. 1 and 2.

As illustrated in FIG. 3, the coil component 1A according to the present embodiment includes a substrate 10A, a first coil pattern 100A formed on one surface 11A of the substrate 10A, and a second coil pattern 200A formed on the other surface 12A of the substrate 10A. Although there is no particular restriction on the material for the substrate 10A, a transparent or translucent film made of a flexible material such as PET resin may be used. Alternatively, the substrate 10A may be a flexible substrate obtained by impregnating glass cloth with epoxy-based resin.

As illustrated in FIG. 1, the first coil pattern 100A is constituted of a planar conductor spirally wound in a plurality of turns. In the example of FIG. 1, the first coil pattern 100A has five turns including turns 110A, 120A, 130A, 140A, and 150A, in which the turns 110A and 150A constitute the outermost and innermost turns, respectively. The turns 110A, 120A, 130A, 140A, and 150A are each radially divided into four parts by three spiral-shaped slits. As a result, the turn 110A is divided into conductive patterns 111A to 114A, the turn 120A is divided into conductive patterns 121A to 124A, the turn 130A is divided into conductive patterns 131A to 134A, the turn 140A is divided into conductive patterns 141A to 144A, and the turn 150A is divided into conductive patterns 151A to 154A. Thus, when viewed in terms of the unit of the divided conductive patterns, the conductive pattern 111A constitutes the outermost turn, and the conductive pattern 154A constitutes the innermost turn.

The conductive patterns 111A to 114A of the turn 110A positioned at the outermost periphery are connected to a terminal electrode E1a through a radially extending lead-out pattern 161A. Further, a radially extending lead-out pattern 162A is provided peripherally adjacent to the lead-out pattern 161A, and the leading end portion thereof is connected to a terminal electrode E2b. The inner peripheral ends of the respective conductive patterns 151A to 154A of the turn 150A positioned at the innermost periphery are connected to through hole conductors H1 to H4, respectively.

The turns 110A, 120A, 130A, 140A, and 150A constituting the first coil pattern 100A each have a circumference region A1 in which the radial position is not changed and a shift region B1 in which the radial position is shifted. The five turns including the turns 110A, 120A, 130A, 140A, and 150A are defined with the shift region B1 as a boundary. As illustrated in FIG. 1, in the present embodiment, both the outer peripheral end and inner peripheral end of the first coil pattern 100A are positioned within the shift region B1.

Further, when a virtual line L1 radially extending from a center point C1 of the first coil pattern 100A and passing between the lead-out patterns 161A and 162A is drawn, the shift region B1 is positioned on the virtual line L1. Further, the through hole conductors H1 and H4 are positioned symmetrically with respect to the virtual line L1, and the through hole conductors H2 and H3 are positioned symmetrically with respect to the virtual line L1.

As illustrated in FIG. 2, the second coil pattern 200A is constituted of a planar conductor spirally wound in a plurality of turns. In the example of FIG. 2, the second coil pattern 200A has five turns including turns 210A, 220A, 230A, 240A, and 250A, in which the turns 210A and 250A constitute the outermost and innermost turns, respectively. The turns 210A, 220A, 230A, 240A, and 250A are each divided into four parts by three spiral-shaped slits. As a result, the turn 210A is divided into conductive patterns 211A to 214A, the turn 220A is divided into conductive patterns 221A to 224A, the turn 230A is divided into conductive patterns 231A to 234A, the turn 240A is divided into conductive patterns 241A to 244A, and the turn 250A is divided into conductive patterns 251A to 254A. Thus, when viewed in terms of the unit of the divided conductive patterns, the conductive pattern 211A constitutes the outermost turn, and the conductive pattern 254A constitutes the innermost turn.

The conductive patterns 211A to 214A of the turn 210A positioned at the outermost periphery are connected to a terminal electrode E2a through a radially extending lead-out pattern 261A. Further, a radially extending lead-out pattern 262A is provided peripherally adjacent to the lead-out pattern 261A, and the leading end portion thereof is connected to a terminal electrode E1b. The inner peripheral ends of the respective conductive patterns 251A to 254A of the turn 250A positioned at the innermost periphery are connected to the through hole conductors H4, H3, H2, and H1, respectively.

The turns 210A, 220A, 230A, 240A, and 250A constituting the second coil pattern 200A each have a circumference region A2 in which the radial position is not changed and a shift region B2 in which the radial position is shifted. The five turns including the 210A, 220A, 230A, 240A, and 250A are defined with the shift region B2 as a boundary. As illustrated in FIG. 2, in the present embodiment, both the outer peripheral end and inner peripheral end of the second coil pattern 200A are positioned within the shift region B2. Further, when a virtual line L2 radially extending from a center point C2 of the second coil pattern 200A and passing between the lead-out patterns 261A and 262A is drawn, the shift region B2 is positioned on the virtual line L2.

The thus configured first and second coil patterns 100A and 200A are formed on one surface 11A and the other surface 12A of the substrate 10A, respectively, such that the center points C1 and C2 thereof overlap each other and that the virtual lines L1 and L2 overlap each other. As a result, the terminal electrodes E1a and E1b overlap each other, and the terminal electrodes E2a and E2b overlap each other. The terminal electrodes E1a and E1b are short-circuited by through hole conductors H5 connecting the lead-out patterns 161A and 262A and are used as a single terminal electrode E1. Similarly, the terminal electrodes E2a and E2b are short-circuited by through hole conductors H6 connecting the lead-out patterns 162A and 261A and are used as a single terminal electrode E2.

Figure 4:
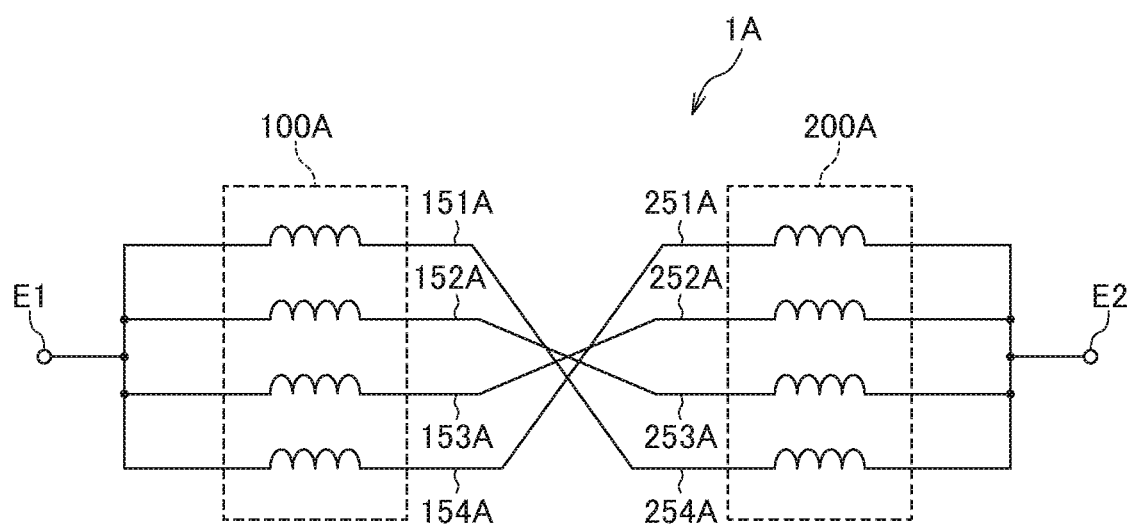
FIG. 4 is an equivalent circuit diagram of the coil component 1A.

Further, the conductive patterns 151A and 254A are short-circuited through the through hole conductor H1, the conductive patterns 152A and 253A are short-circuited through the through hole conductor H2, the conductive patterns 153A and 252A are short-circuited through the through hole conductor H3, and the conductive patterns 154A and 251A are short-circuited through the through hole conductor H4. Thus, as illustrated in FIG. 4, the first and second coil patterns 100A and 200A are connected in series to thereby form a spiral coil having 10 turns in total.

Although not particularly limited, as illustrated in FIG. 3, the conductive patterns positioned in the circumference region A1 of the first coil pattern 100A and the conductive patterns positioned in the circumference region A2 of the second coil pattern 200A coincide in position completely with each other in a planar direction. This reduces the area of the substrate 10A that is covered with the conductive patterns in a plan view, making it possible to reduce eddy current loss. In addition, by making the conductive patterns positioned in the circumference region A1 and the conductive patterns positioned in the circumference region A2 overlap each other, it is possible to minimize visual interference between the first and second coil patterns 100A and 200A. That is, regardless of whether the substrate 10A is transparent or translucent, when the first coil pattern 100A is subjected to appearance inspection, the second coil pattern 200A does not become a visual obstacle and, conversely, when the second coil pattern 200A is subjected to appearance inspection, the first coil pattern 100A does not become a visual obstacle. This allows appearance inspection using an appearance inspection apparatus to be properly executed.

Further, as illustrated in FIG. 3, the coil component 1A according to the present embodiment has a feature in that the pattern width of each of the first and second coil patterns 100A and 200A is not constant. That is, the pattern width is smaller on the inner and outer peripheral sides and is larger on the center side.

More specifically, assuming that the pattern width of each of the conductive patterns 154A and 254A constituting the innermost turn is W1, the pattern width of each of the conductive patterns 111A and 211A constituting the outermost turn is W2, the pattern width of each of the conductive patterns 133A and 233A (or 132A and 232A) constituting the middle turn whose turn number counted from the innermost or outermost turn is intermediate among all the turns is W3, and the pattern width of each of the conductive patterns 124A and 224A located at the center position of the line length of the coil pattern along the conductive pattern is W4,

W1, W2<W3, W4 is satisfied.

The reason that the pattern widths W1 and W2 of the respective innermost and outermost turns are reduced is that the intensity of a magnetic field at these portions is strong, and thus a large loss is generated by heat generation caused due to eddy current. That is, by reducing the pattern widths W1 and W2 of the respective innermost and outermost turns, the amount of magnetic flux that interferes with the innermost and outermost turns is reduced, thereby making it possible to reduce eddy current. The pattern width W1 of the innermost turn is preferably larger than the pattern thickness of each of the coil patterns 100A and 200A. This allows eddy current flowing in the coil patterns 100A and 200A to concentrate on radially opposite sides of the conductive pattern, so that it is possible to obtain a remarkable loss reduction effect obtained by reducing the pattern width of each of the coil patterns 100A and 200A.

Further, the pattern thickness of the conductive pattern may be smaller in the innermost turn than in the outermost pattern. Particularly, the pattern thickness is preferably reduced gradually or stepwise from the outermost turn toward the innermost turn. With this configuration, loss reduction effect obtained by reducing the pattern width becomes remarkable on the inner peripheral side, which is more strongly affected by eddy current.

Figure 5:
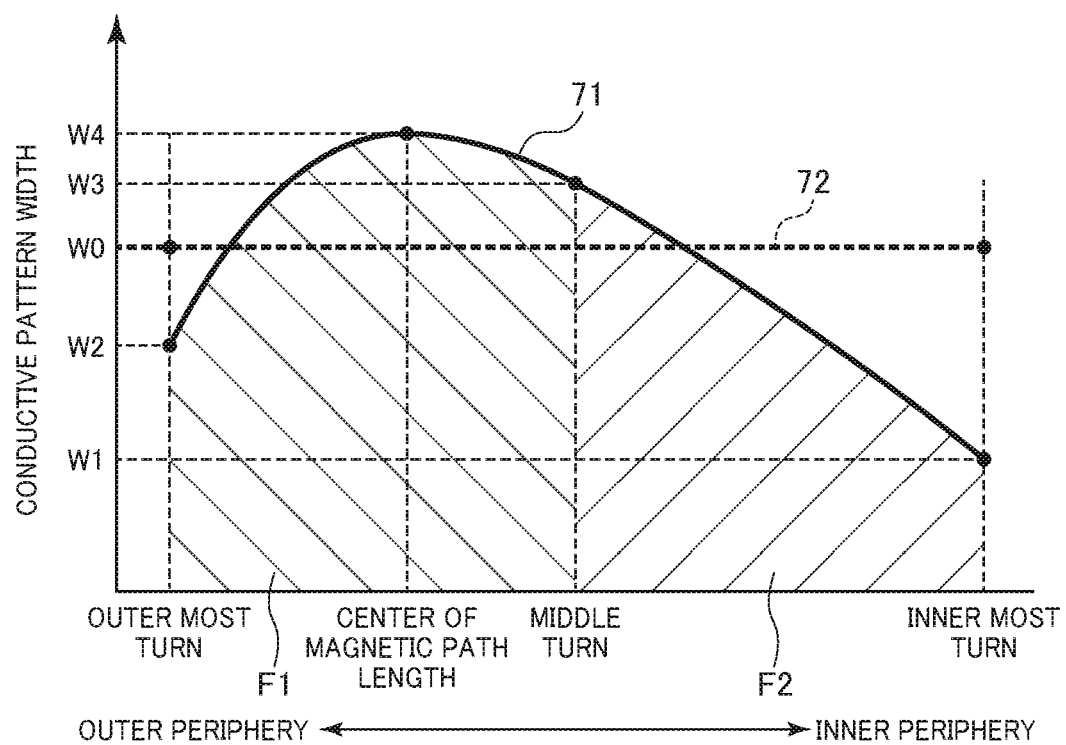
FIG. 5 is a graph for explaining a first example illustrating the relationship between the radial position of a conductive pattern and a pattern width thereof.

FIG. 5 is a graph for explaining a first example illustrating the relationship between the radial position of the conductive pattern and the pattern width thereof. In FIG. 5, a continuous line 71 denotes the pattern width of the coil component 1A in the present embodiment, and a dashed line 72 denotes the pattern width of a coil component according to a comparative example. The comparative example is an example in which the pattern width of the conductive pattern is made constant.

As illustrated in FIG. 5, in the present embodiment, the pattern width W1 of the innermost turn is the smallest. The pattern width is increased gradually or stepwise from the innermost turn toward the center position of the line length, and the pattern width W4 at the center position of the line length is the largest. The pattern width is reduced gradually or stepwise from the center position of the line length toward the outermost turn, and the pattern width becomes W2 at the outermost turn. In the example of FIG. 5, the pattern width W1 of the innermost turn is smaller than the pattern width W2 of the outermost pattern. This is because the intensity of a magnetic field is stronger at the innermost turn than at the outermost turn, and this is reflected on the pattern width. Thus, in the present embodiment,

W1<W2<W3<W4 is satisfied. In the comparative example, the pattern width of the conductive pattern is W0 in all the turns.

The center position of the line length is positioned on the outer peripheral side relative to the middle turn, and at this portion, the pattern width (W4) becomes maximum. This is because the intensity of a magnetic field is weaker at the center of the line length than at the middle turn, and this is reflected on the pattern width. In the present embodiment, the center position of the line length has the largest pattern width W4, and the pattern width is gradually reduced as the distance from the center of the line length increases; therefore, considering the middle turn as the center, the total or average value of the pattern widths of the turns positioned on the outer peripheral side as viewed from the middle turn is larger than the total or average value of the pattern widths of the turns positioned on the inner peripheral side as viewed from the middle turn. That is, area F2 is larger than area F1 shown in the graph of FIG. 5. Thus, in the present embodiment, considering the middle turn as the center, the pattern width is not symmetrical on both the inner peripheral and outer peripheral sides.

Figure 6:
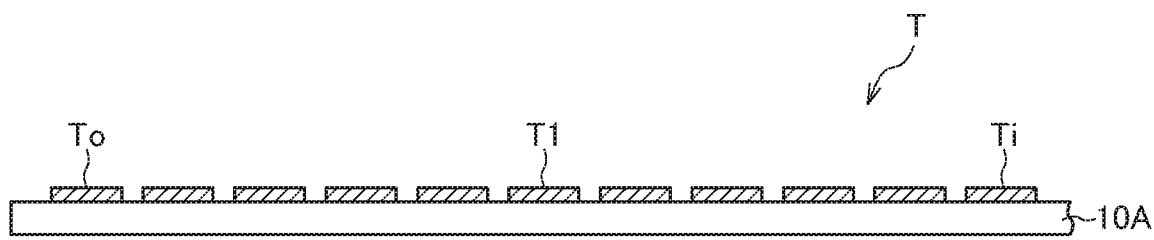
FIG. 6 is a schematic cross-sectional view for explaining definition of a middle turn when the total number of turns is odd.

Here, the middle turn is defined as follows. As illustrated in the example of FIG. 6, when the number of turns of a coil pattern T is odd (11 turns in this example), the middle turn corresponds to a turn T1 (sixth turn in this example) at which a turn number counted from an innermost turn Ti and a turn number counted from an outermost turn To coincide with each other.

Figure 7:
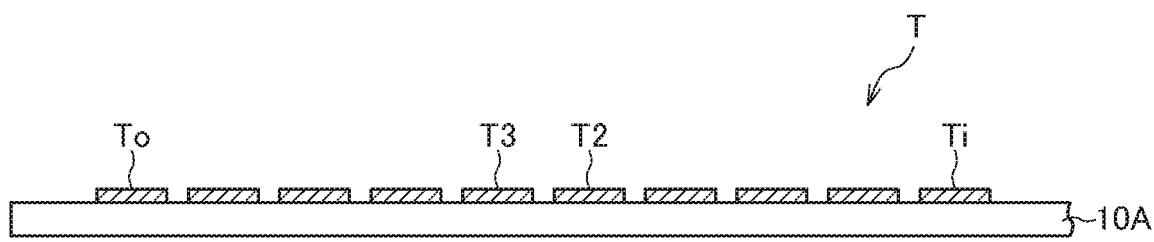
FIG. 7 is a schematic cross-sectional view for explaining definition of the middle turn when the total number of turns is even.

Further, as illustrated in the example of FIG. 7, when the number of turns of a coil pattern T is even (10 turns in this example), the middle turn corresponds to a turn T2 (fifth turn counted from the inner peripheral end) whose turn number counted from an innermost turn Ti corresponds to half of the total number of turns or a turn T3 (fifth turn counted from the outer peripheral end) whose turn number counted from an outermost turn To corresponds to half of the total number of turns. When the number of turns of a coil pattern T is even, both the turns T2 and T3 may be regarded as the middle turn, or only one of them may be regarded as the middle turn. Further, the average value of the pattern widths of the turns T2 and T3 may be regarded as the pattern width W3 of the middle turn.

Figure 8:
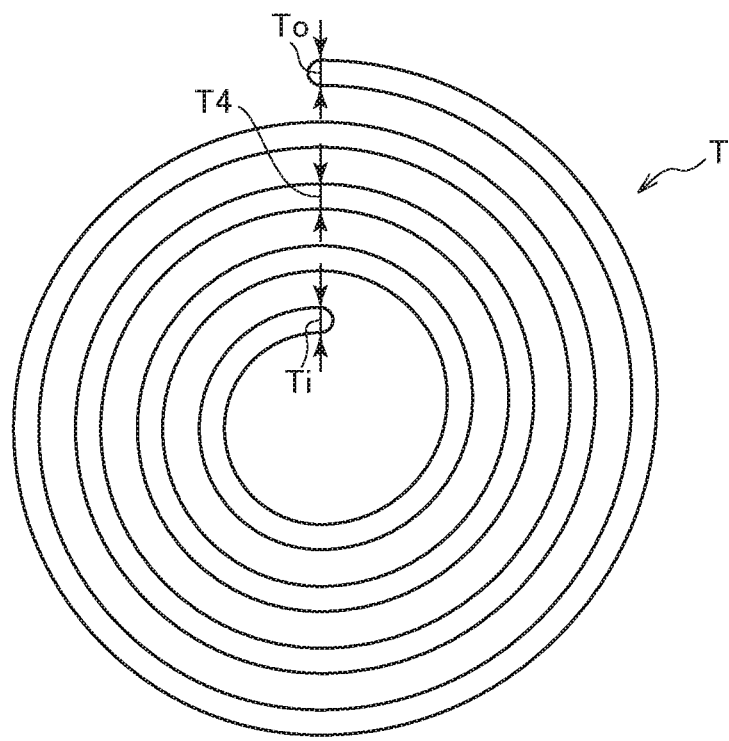
FIG. 8 is a schematic plan view for explaining definition of the middle turn when the total number of turns is even.
Figure 9:
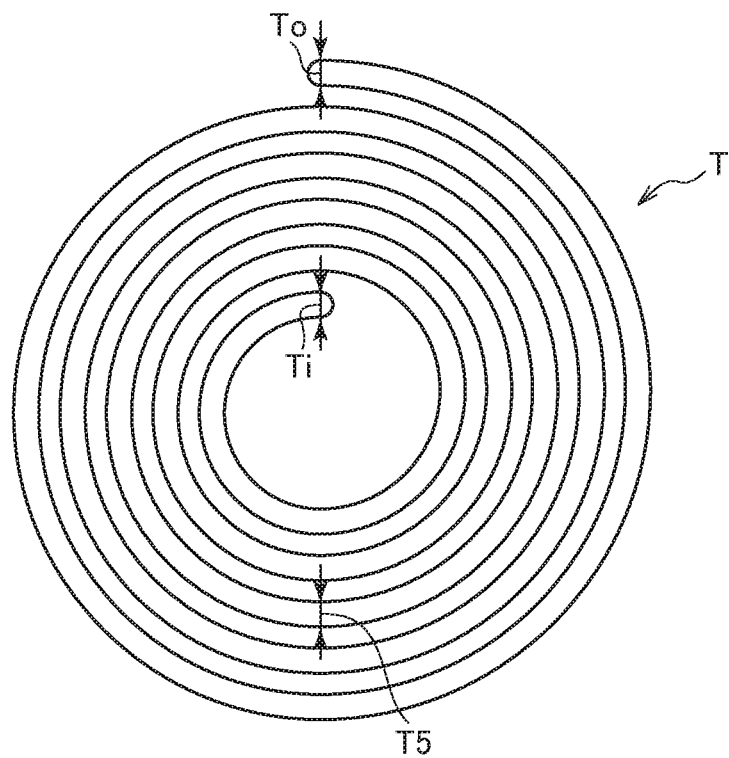
FIG. 9 is a schematic plan view for explaining definition of the middle turn when the total number of turns is odd.

Further, as illustrated in the example of FIG. 8, the pattern width of the conductive pattern at the center position of the number of turns may be regarded as the pattern width W3 of the middle turn. In the example of FIG. 8, the total number of turns of a coil pattern T is four, so that the pattern width at a position T4, which is the second turn counted from the inner peripheral end or outer peripheral end, may be regarded as the pattern width W3 of the middle turn. The same applies to the case where the total number of turns is odd and, as illustrated in the example of FIG. 9, when the total number of turns of a coil pattern T is five, the pattern width at a position T5, which is the 2.5th turn counted from the inner peripheral end or outer peripheral end, may be regarded as the pattern width W3 of the middle turn.

On the other hand, when each turn is radially divided by the spiral-shaped slits as in the present embodiment, each conductive pattern may be regarded as one turn so as to identify the middle turn. That is, irrespective of whether or not one turn is divided into a plurality of conductive patterns, the middle turn may be identified based on the number of the conductive patterns appearing in the cross section (20 conductive patterns in the example of FIG. 3).

The center position of the line length is defined as follows. When each turn is not radially divided by the spiral-shaped silts, that is, when the coil pattern is a simple spiral pattern, just the intermediate position of the coil length along the coil pattern corresponds to the center position of the line length. On the other hand, when each turn is radially divided by the spiral-shaped slits as in the present embodiment, just the intermediate position of the coil length along the coil pattern in a case where the coil pattern is assume to be a simple spiral pattern in which the entire conductive pattern can be drawn with a single stroke from the inner peripheral end toward the outer peripheral end corresponds to the center position of the line length. That is, in the example of FIG. 1, the center position of the line length in a case where it is assumed that a total of 20 conductive patterns including the conductive patterns 111A to 114A, 121A to 124A, 131A to 134A, 141A to 144A, and 151A to 154A are connected in a spiral shape and thereby the number of turns of the coil pattern 100A is 20 corresponds to this. Alternatively, the following method may be adopted: the average value of the lengths of the plurality of respective conductive patterns constituting each turn is calculated, the total sum of the average values for the respective turns is regarded as the line length, and the center position is defined based on the obtained line length.

As described above, in the coil component according to the present embodiment, the pattern width of the coil pattern is designed according to the intensity of a magnetic field, so that AC resistance can be reduced further as compared to a case where the pattern width of the coil pattern is made symmetrical on both the inner and outer peripheral sides.

In addition, in the coil component according to the present embodiment, each turn is radially divided into four parts by the spiral-shaped slits, so that inhomogeneous current density distribution is reduced as compared to a case where such slits are not formed. As a result, DC resistance and AC resistance can be reduced. Further, the radial position of the conductor part of the first coil pattern 100A and that of the conductor part of the second coil pattern 200A are completely interchanged with each other, thereby canceling a difference between dimensions of inner and outer peripheries. This homogenizes current density distribution, allowing further reduction in DC resistance and AC resistance.

Figure 10:
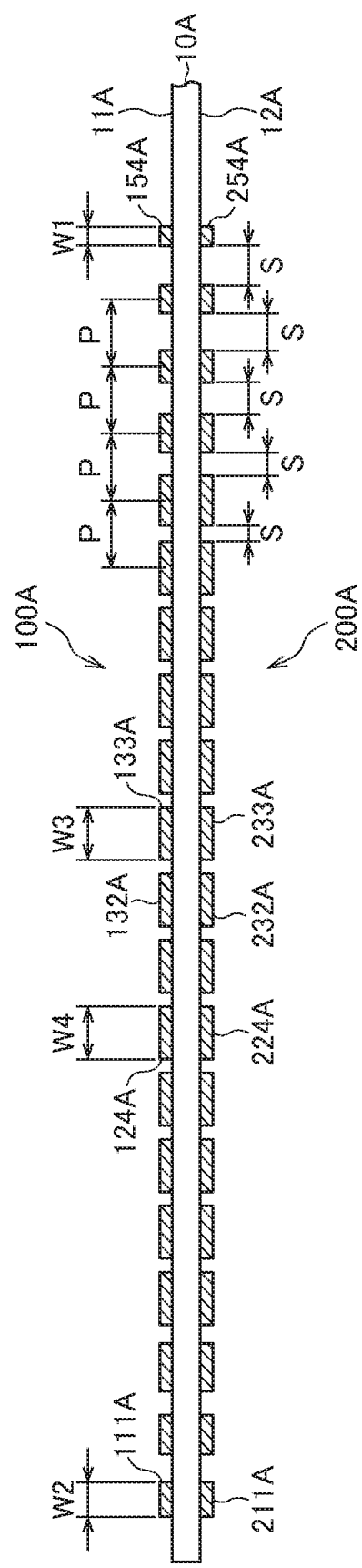
FIG. 10 is a schematic cross-sectional view according to a modification.

Further, as illustrated in FIG. 3, in the present embodiment, the dimension of a space S between radially adjacent turns is made constant. This prevents an unnecessary space from being generated in the vicinity of the inner or outer peripheral end where the pattern width is smaller, thereby ensuring a sufficient pattern width and thus reducing DC resistance. However, the dimension of the space S need not be made constant in the present invention, but may be varied according to the pattern width as in the modification illustrated in FIG. 10. In the example of FIG. 10, a radial pitch P between the adjacent conductive patterns is constant, whereby the smaller the pattern width is, the larger the dimension of the space S becomes, and, conversely, the larger the pattern width is, the smaller the dimension of the space S becomes. With this configuration, it is possible to obtain the same inductance as is obtained when the pattern width is made constant.

Figure 11:
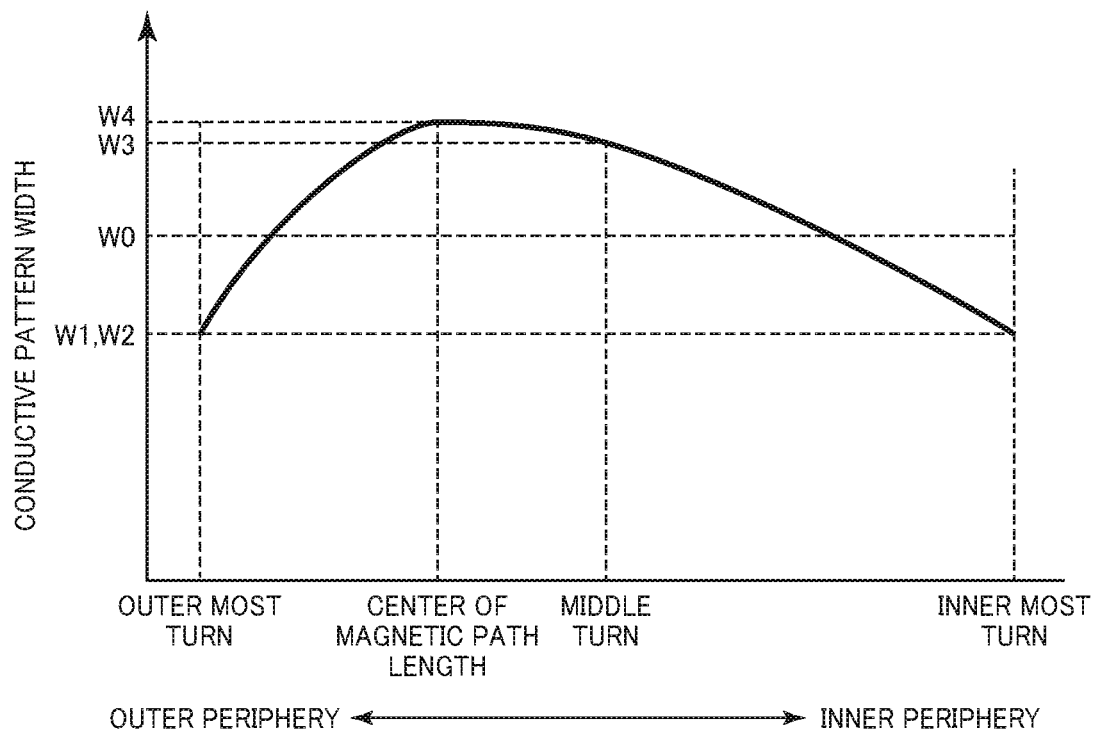
FIG. 11 is a graph for explaining a second example illustrating the relationship between the radial position of the conductive pattern and pattern width thereof.

FIG. 11 is a graph for explaining a second example illustrating the relationship between the radial position of the conductive pattern and the pattern width thereof. In the example of FIG. 11, the pattern width W1 of the innermost turn and the pattern width W2 of the outermost turn are equal to each other. As exemplified in this example, in the present invention, the pattern width W1 of the innermost turn need not be smaller than the pattern width W2 of the outermost turn. That is,

W1=W2 may be satisfied.

Figure 12:
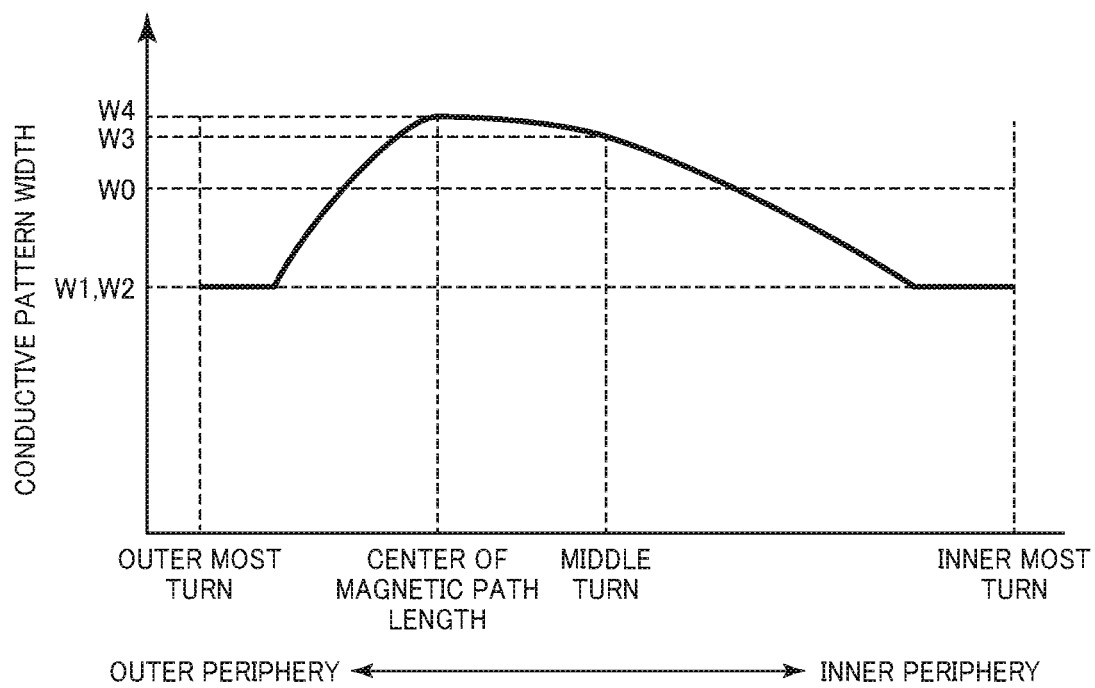
FIG. 12 is a graph for explaining a third example illustrating the relationship between the radial position of the conductive pattern and the pattern width thereof.

FIG. 12 is a graph for explaining a third example illustrating the relationship between the radial position of the conductive pattern and the pattern width thereof. In the example of FIG. 12, the pattern width W1 of the innermost turn and the pattern width W2 of the outermost turn are equal to each other, and the pattern widths of the innermost and outermost turns are each maintained over a plurality of turns. As exemplified in this example, in the present invention, the conductive pattern having the smallest pattern width may be continued over a plurality of turns.

Figure 13:
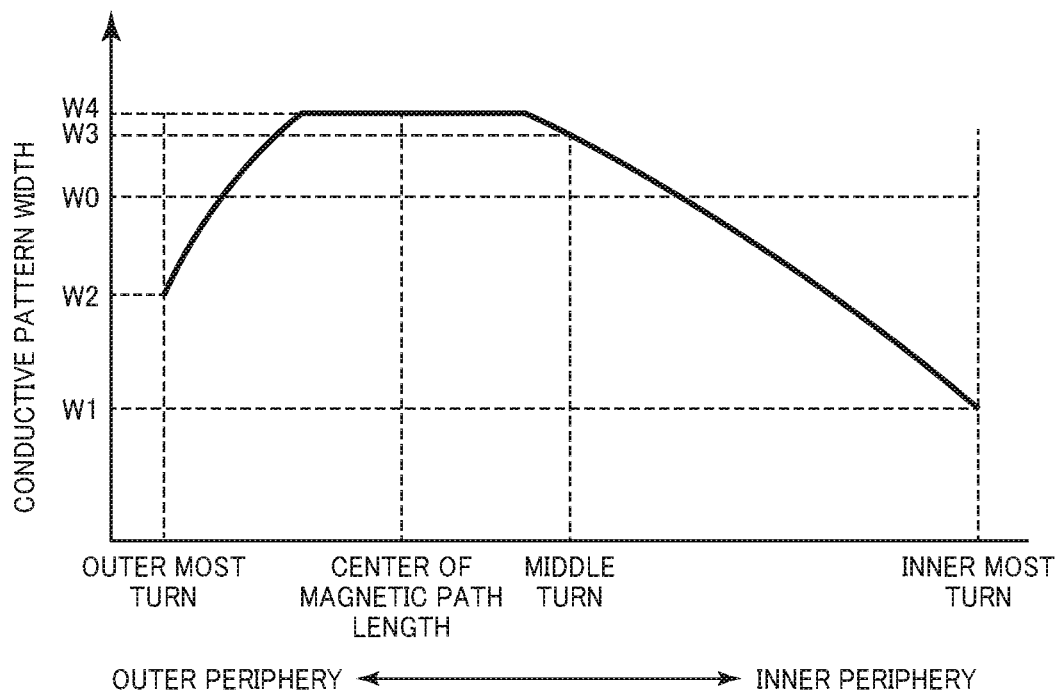
FIG. 13 is a graph for explaining a fourth example illustrating the relationship between the radial position of the conductive pattern and the pattern width thereof.

FIG. 13 is a graph for explaining a fourth example illustrating the relationship between the radial position of the conductive pattern and the pattern width thereof. In the example of FIG. 13, the pattern width equal to the pattern width W4 at the center of the line length is maintained over a plurality of turns. As exemplified in this example, the conductive pattern having the largest pattern width may be continued over a plurality of turns.

Figure 14:
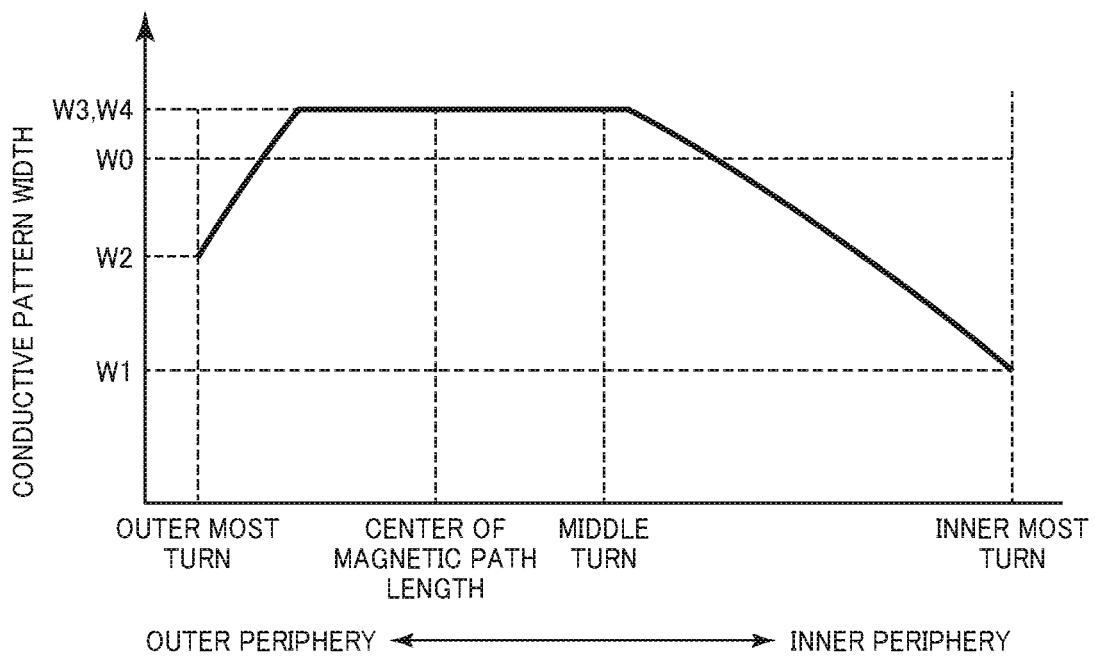
FIG. 14 is a graph for explaining a fifth example illustrating the relationship between the radial position of the conductive pattern and the pattern width thereof.

FIG. 14 is a graph for explaining a fifth example illustrating the relationship between the radial position of the conductive pattern and the pattern width thereof. In the example of FIG. 14, the pattern width equal to the pattern width W4 at the center of the line length is maintained over a plurality of turns including the middle turn. As exemplified in this example, the conductive pattern having the largest pattern width may include the middle turn. That is,

W3=W4 may be satisfied.

Figure 15:
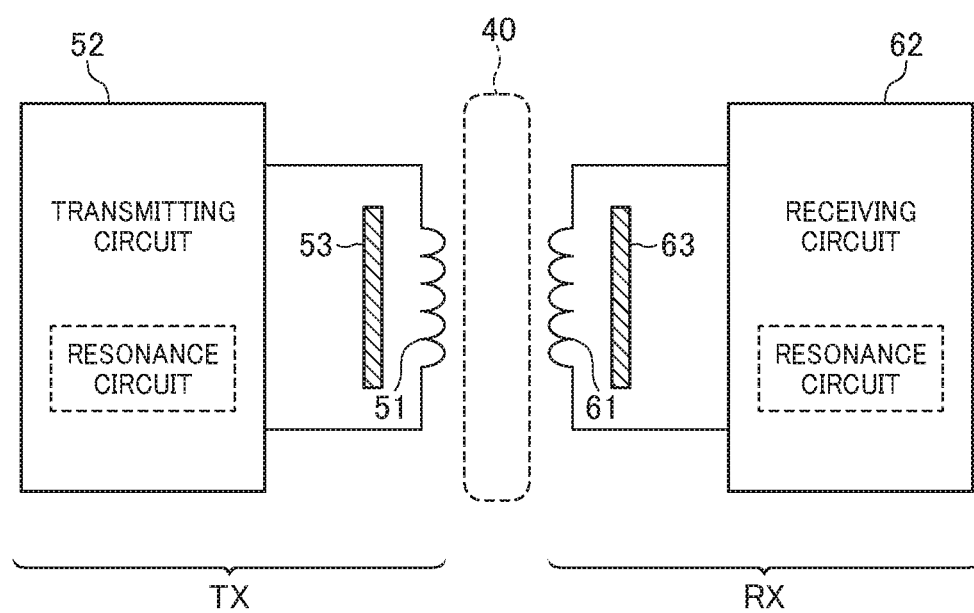
FIG. 15 is a block diagram of a wireless power transmission system using the coil component 1A.

The coil component 1A according to the present embodiment can be applied to a wireless power transmission system illustrated in FIG. 15. The wireless power transmission system illustrated in FIG. 15 is a system including a wireless power transmitter TX and a wireless power receiver RX and can transmit power by wireless by making a feeding coil 51 included in the wireless power transmitter TX and a receiving coil 61 included in the wireless power receiver RX face each other through a space 40. The feeding coil 51 is connected to a transmitting circuit 52 including a power supply circuit, an inverter circuit, a resonance circuit, and the like and thereby receives supply of AC current from the transmitting circuit 52. The receiving coil 61 is connected to a receiving circuit 62 including a resonance circuit, a rectification circuit, a smoothing circuit, and the like. The feeding coil 51 and receiving coil 61 are made to face each other to be magnetically coupled to each other, whereby power can be transmitted by wireless from the wireless power transmitter TX to the wireless power receiver RX through the space 40.

In the thus configured wireless power transmission system, the coil component 1A according to the present embodiment can be used as the feeding coil 51 or receiving coil 61. In this case, a magnetic sheet 53 is preferably disposed on the side opposite the space 40 across the feeding coil 51, and a magnetic sheet 63 is preferably disposed on the side opposite the space 40 across the receiving coil 61. The existence of the magnetic sheets 53 and 63 can enhance inductance of each of the feeding coil 51 and receiving coil 61, achieving more efficient power transmission. The use of the magnetic sheet 53 or magnetic sheet 63 increases the magnetic field of the feeding coil 51 or receiving coil 61, so that increase in the AC resistance of the feeding coil 51 or receiving coil 61 due to the influence of the magnetic field becomes prominent; however, the application of the coil component 1A or the feeding coil 51 to receiving coil 61 allows an efficient reduction in the AC resistance.

Here, assuming that the angular frequency of current flowing in the feeding coil 51 or receiving coil 61 is ω, the electric resistivity of each of the coil patterns 100A and 200A is ρ, and the absolute permeability of each of the coil patterns 100A and 200A is μ, a skin depth d of current flowing in the coil patterns 100A and 200A can be represented by the following expression. Assuming that a resonance frequency is f, the angular frequency ω can be represented by 2πf.

$$d = \sqrt{\frac{2\rho}{\omega\mu}}$$

In this case, the pattern thickness of each of the coil patterns 100A and 200A is preferably smaller than the skin depth d. When the pattern thickness of each of the coil patterns 100A and 200A is smaller than the skin depth d, eddy current flowing in the coil patterns 100A and 200A concentrates on the radially opposite sides of the conductive pattern, so that it is possible to obtain a remarkable loss reduction effect resulting from a reduction in the pattern width of each of the coil patterns 100A and 200A. For example, when a resonance frequency is 100 kHz, the skin depth d of a copper wire coil is about 0.2 mm and, in this case, when the pattern thickness of each of the coil patterns 100A and 200A is set to smaller than 0.2 mm, e.g., about 50 μm to about 100 μm, it is possible to obtain a remarkable loss reduction effect resulting from a reduction in the pattern width.

Figure 16:
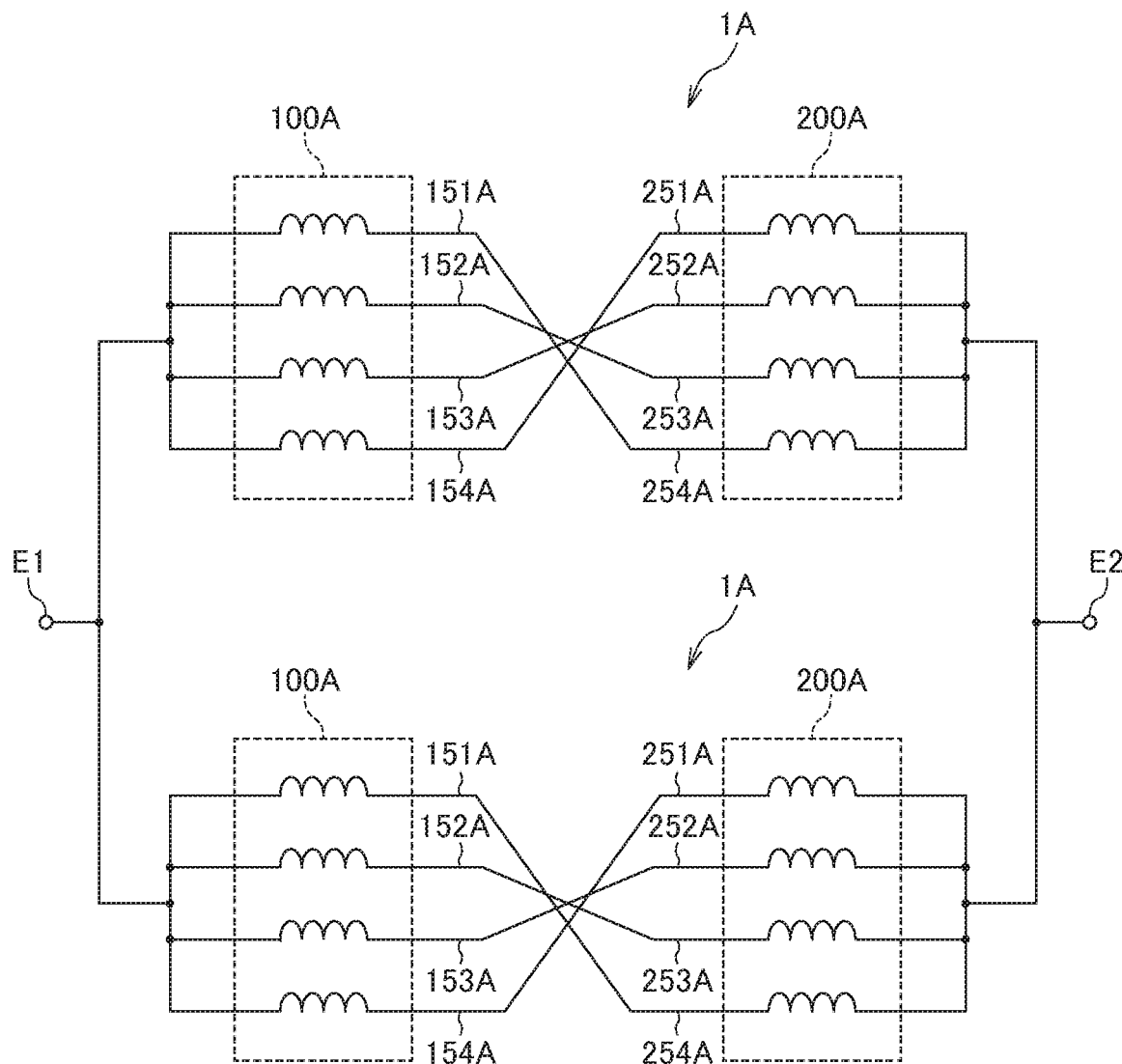
FIG. 16 is an equivalent circuit diagram when two coil components 1A are connected in parallel.

Further, when the reduction effect of the AC resistance required in the two coil patterns 100A and 200A is insufficient, a configuration illustrated in FIG. 16 may be adopted, in which a plurality (two, in the example of FIG. 16) of the coil components 1A according to the present embodiment are connected in parallel, whereby the AC resistance can be reduced further. In a common pattern coil, a portion at which loss is generated due to the influence of a magnetic field increases even when a plurality of pattern coils are connected in parallel, making it difficult to effectively reduce the AC resistance value; however, in the coil according to the present invention, the loss due to the influence of a magnetic field can be reduced, so that the AC resistance reduction effect when a plurality of the coil components are connected in parallel becomes more remarkable.

Second Embodiment

Figure 17:
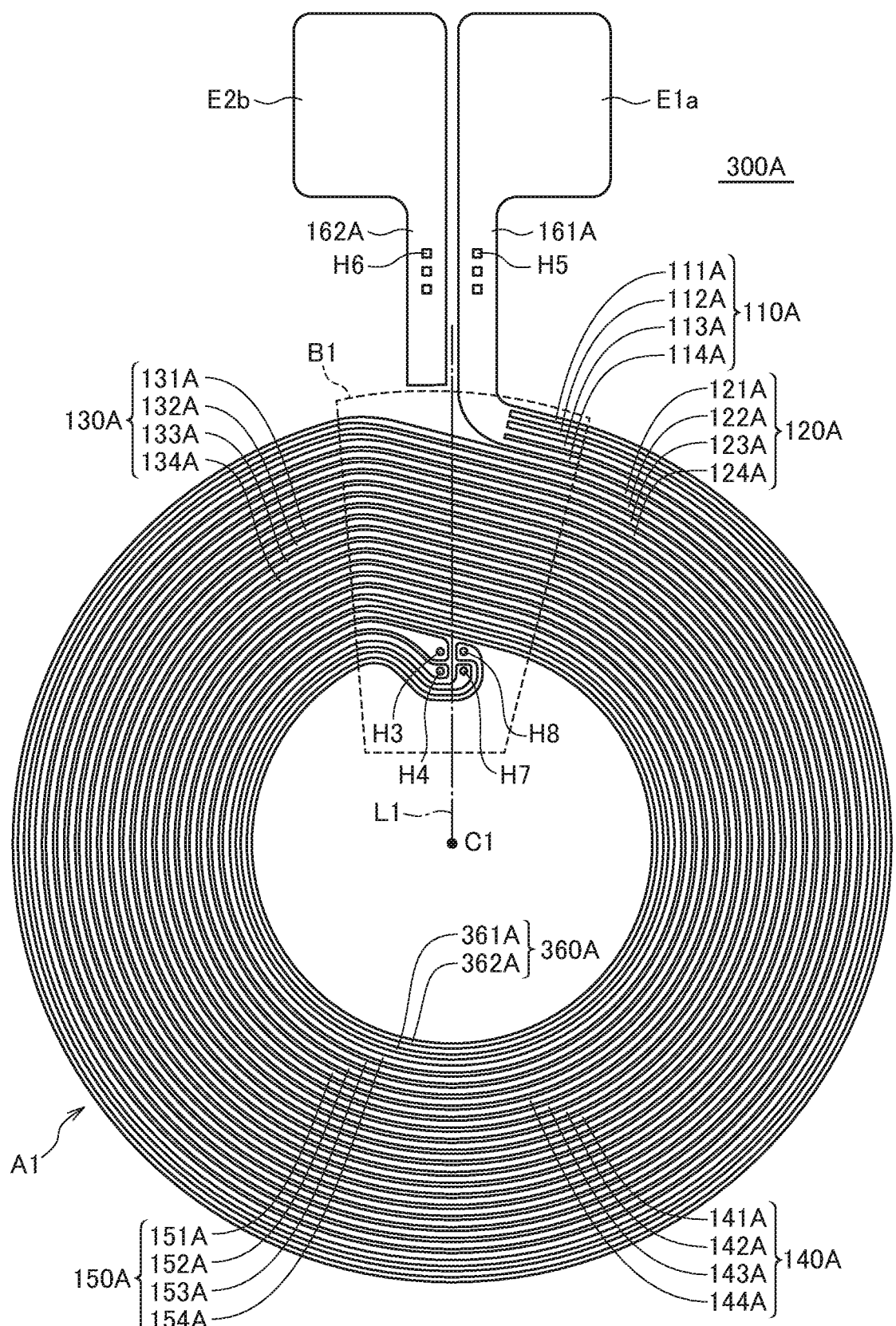
FIG. 17 is a schematic plan view for explaining the pattern shape of a first coil pattern 300A included in a coil component 2A according to a second embodiment of the present invention.
Figure 18:
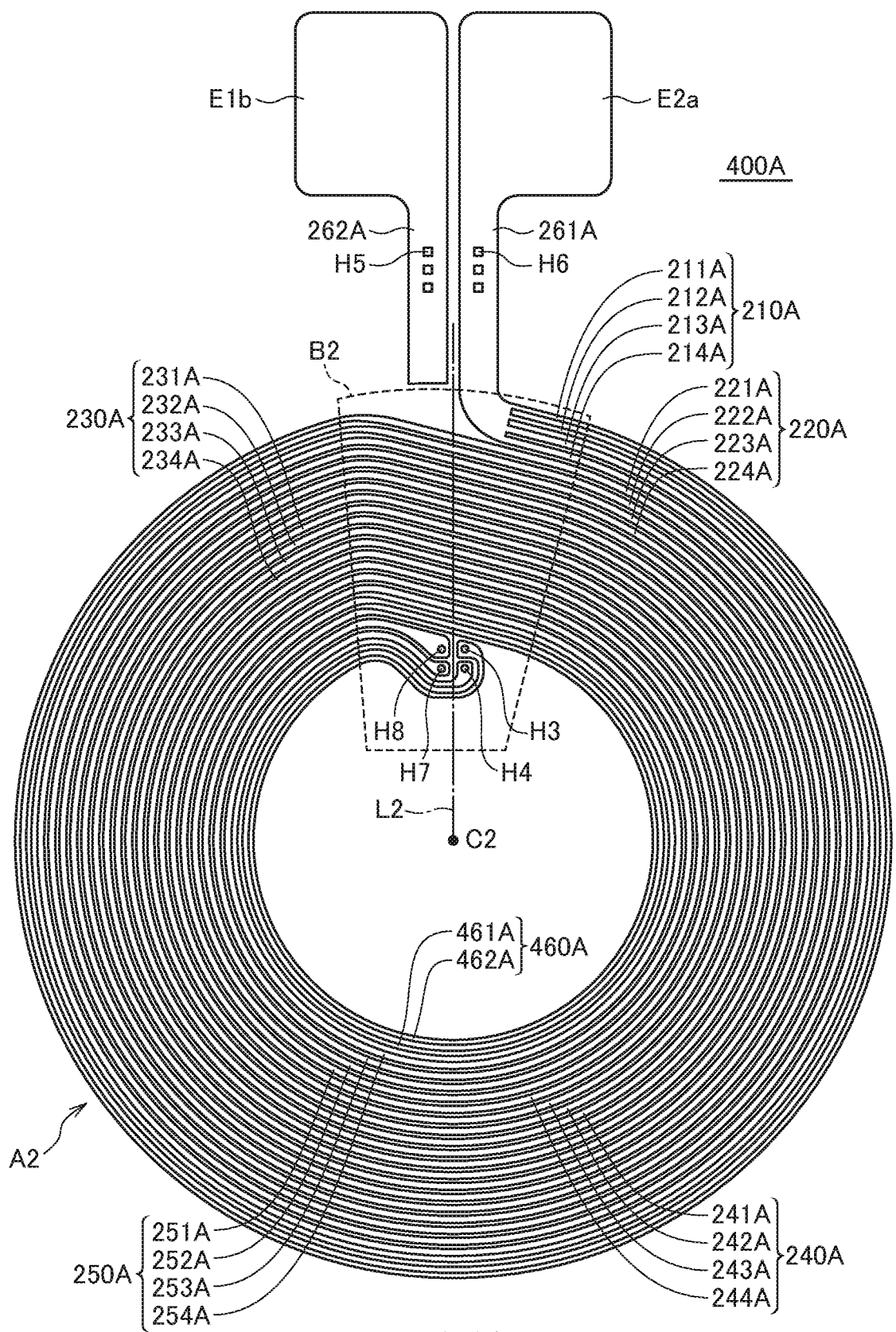
FIG. 18 is a schematic plan view for explaining the pattern shape of a second coil pattern 400A included in the coil component 2A according to the second embodiment of the present invention.

FIGS. 17 and 18 are schematic plan views for explaining pattern shapes of a first coil pattern 300A and a second coil pattern 400A, respectively, included in a coil component 2A according to the second embodiment of the present invention.

As illustrated in FIG. 17, the first coil pattern 300A has a configuration obtained by adding conductive patterns 361A and 362A to the first coil pattern 100A illustrated in FIG. 1 and providing through hole conductors H7 and H8 at the inner peripheral ends of the respective conductive patterns 361A and 362A. The conductive pattern 361A is a conductive pattern of one turn continued from the conductive pattern 151A, and conductive pattern 362A is a conductive pattern of one turn continued from the conductive pattern 152A. In the present embodiment, the through hole conductor H3 and the through hole conductor H8 are disposed symmetrically with respect to the virtual line L1, and the through hole conductor H4 and the through hole conductor H7 are disposed symmetrically with respect to the virtual line L1. Other configurations are basically the same as those of the first coil pattern 100A illustrated in FIG. 1, so the same reference numerals are given to the same elements, and overlapping description will be omitted.

As illustrated in FIG. 18, the second coil pattern 400A has a configuration obtained by adding conductive patterns 461A and 462A to the second coil pattern 200A illustrated in FIG. 2 and providing through hole conductors H4 and H3 at the inner peripheral ends of the respective conductive patterns 461A and 462A. The conductive pattern 461A is a conductive pattern of one turn continued from the conductive pattern 251A, and conductive pattern 462A is a conductive pattern of one turn continued from the conductive pattern 252A. The inner peripheral ends of the respective conductive patterns 253A and 254A are connected to the through hole conductors H8 and H7, respectively. Other configurations are basically the same as those of the second coil pattern 200A illustrated in FIG. 2, so the same reference numerals are given to the same elements, and overlapping description will be omitted.

Figure 19:
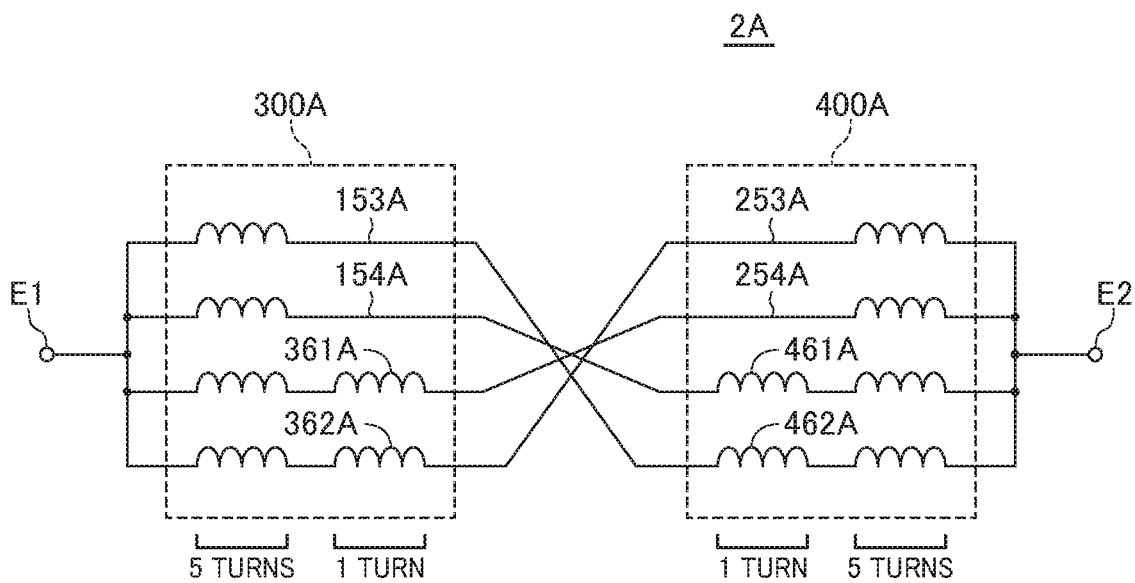
FIG. 19 is an equivalent circuit diagram of a coil component 2A.

The thus configured first and second coil patterns 300A and 400A are formed on one surface 11A and the other surface 12A of the substrate 10A, respectively, such that the center points C1 and C2 thereof overlap each other and that the virtual lines L1 and L2 overlap each other. As a result, the conductive patterns 153A and 462A are short-circuited through the through hole conductor H3, the conductive patterns 154A and 461A are short-circuited through the through hole conductor H4, the conductive patterns 361A and 254A are short-circuited through the through hole conductor H7, and the conductive patterns 362A and 253A are short-circuited through the through hole conductor H8. Thus, as illustrated in FIG. 19, the first and second coil patterns 300A and 400A are connected in series to thereby form a spiral coil having 11 turns in total.

As described above, in the present embodiment, it is possible to realize a spiral coil having an odd number of turns even though coil patterns on the front and back sides have the same pattern shape.

Third Embodiment

Figure 20:
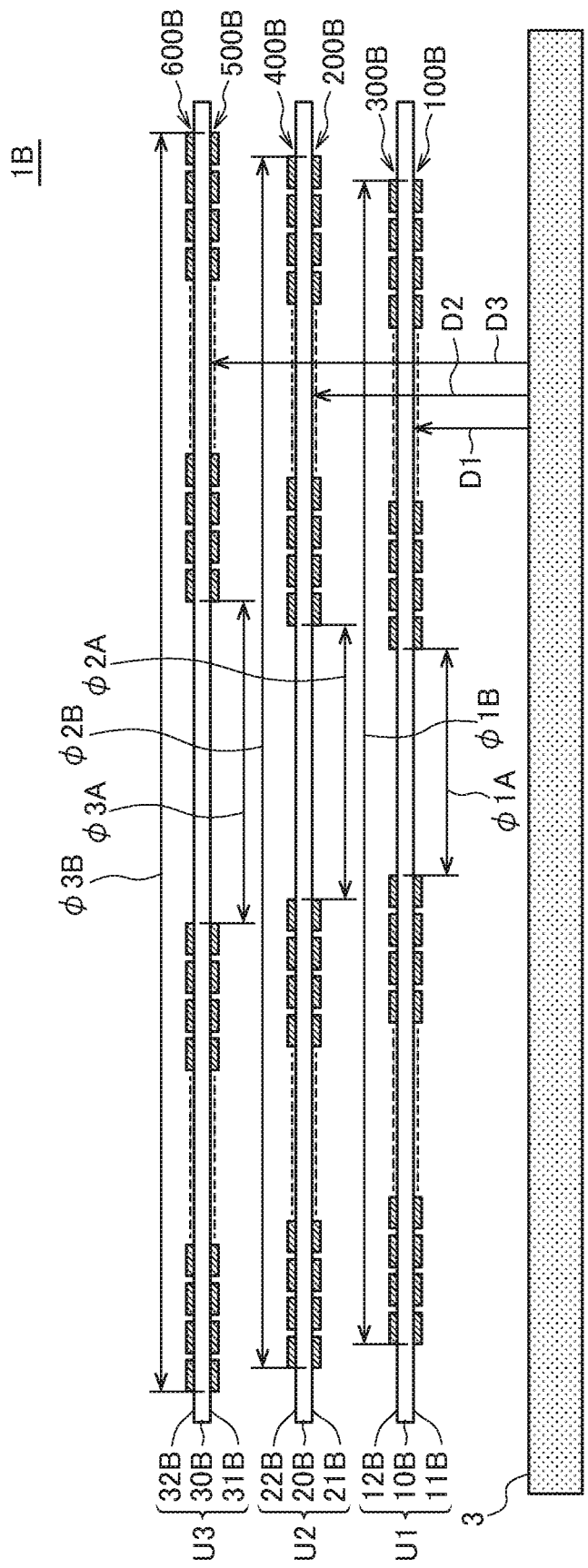
FIG. 20 is a schematic cross-sectional view for explaining the configuration of a coil component 1B according to a third embodiment of the present invention.

FIG. 20 is a schematic cross-sectional view for explaining the configuration of a coil component 1B according to a third embodiment of the present invention.

As illustrated in FIG. 20, the coil component 1B according to the present embodiment includes a magnetic sheet 3 and three coil units U1 to U3 disposed so as to overlap the magnetic sheet 3. The magnetic sheet 3 is a sheet member made of a high permeability material such as ferrite, permalloy, or a composite magnetic material and functions as a magnetic path for magnetic flux interlinking the coil units U1 to U3.

The coil units U1 to U3 are each a unit obtained by forming a coil pattern on both surfaces of a substrate and are disposed on the magnetic sheet 3 such that the inner diameter areas thereof overlap each other in a plan view. The coil unit U1 is the closest to the magnetic sheet 3, and the coil unit U3 is the farthest therefrom. That is, assuming that the distance between the magnetic sheet 3 and the coil unit U1, that between the magnetic sheet 3 and the coil unit U2, and that between the magnetic sheet 3 and the coil unit U3 in the coil axis direction are D1 to D3, respectively, $D1<D2<D3$ is satisfied.

The coil unit U1 includes a substrate 10B, a first coil pattern 100B formed on one surface 11B of the substrate 10B and a third coil pattern 300B formed on the other surface 12B of the substrate 10B. The coil unit U2 includes a substrate 20B, a second coil pattern 200B formed on one surface 21B of the substrate 20B and a fourth coil pattern 400B formed on the other surface 22B of the substrate 20B. The coil unit U3 includes a substrate 30B, a fifth coil pattern 500B formed on one surface 31B of the substrate 30B and a sixth coil pattern 600B formed on the other surface 32B of the substrate 30B. Although there is no particular restriction on the material for the substrates 10B, 20B, and 30B, a transparent or translucent film made of a flexible material such as PET resin may be used. Alternatively, the substrates 10B, 20B, and 30B may be a flexible substrate obtained by impregnating glass cloth with epoxy-based resin. Further, in the present embodiment, the coil patterns 100B, 200B, 300B, 400B, 500B, and 600B have the same number of turns.

As illustrated in FIG. 20, in the present embodiment, assuming that the inner and outer diameters of each of the coil patterns 100B and 300B constituting the coil unit U1 are $\phi 1A$ and $\phi 1B$, respectively, the inner and outer diameters of each of the coil patterns 200B and 400B constituting the coil unit U2 are $\phi 2A$ and $\phi 2B$, respectively, and the inner and outer diameters of each of the coil patterns 500B and 600B constituting the coil unit U3 are $\phi 3A$ and $\phi 3B$, respectively, $\phi 1A < \phi 2A < \phi 3A$ is satisfied, and $\phi 1B < \phi 2B < \phi 3B$ is satisfied. That is, the inner diameter $\phi 1A$ and outer diameter $\phi 1B$ of the coil unit U1 closest to the magnetic sheet 3 are the smallest, and the inner diameter $\phi 3A$ and outer diameter $\phi 3B$ of the coil unit U3 farthest from the magnetic sheet 3 are the largest.

Since the coil patterns 100B, 200B, 300B, 400B, 500B, and 600B have the same number of turns, the coil patterns 200B and 400B constituting the coil unit U2 have a larger line length than the coil patterns 100B and 300B constituting the coil unit U1, and the coil patterns 500B and 600B constituting the coil unit U3 have a larger line length than the coil patterns 200B and 400B constituting the coil unit U2. As described later, in the present embodiment, the coil patterns 100B, 200B, 300B, 400B, 500B, and 600B each have a plurality of parallel lines radially divided by spiral-shaped slits. In this case, the average line length of the plurality of divided lines of each of the coil patterns 100B, 200B, 300B, 400B, 500B, and 600B may be regarded as the line length of each of the coil patterns 100B, 200B, 300B, 400B, 500B, and 600B.

Figure 21:
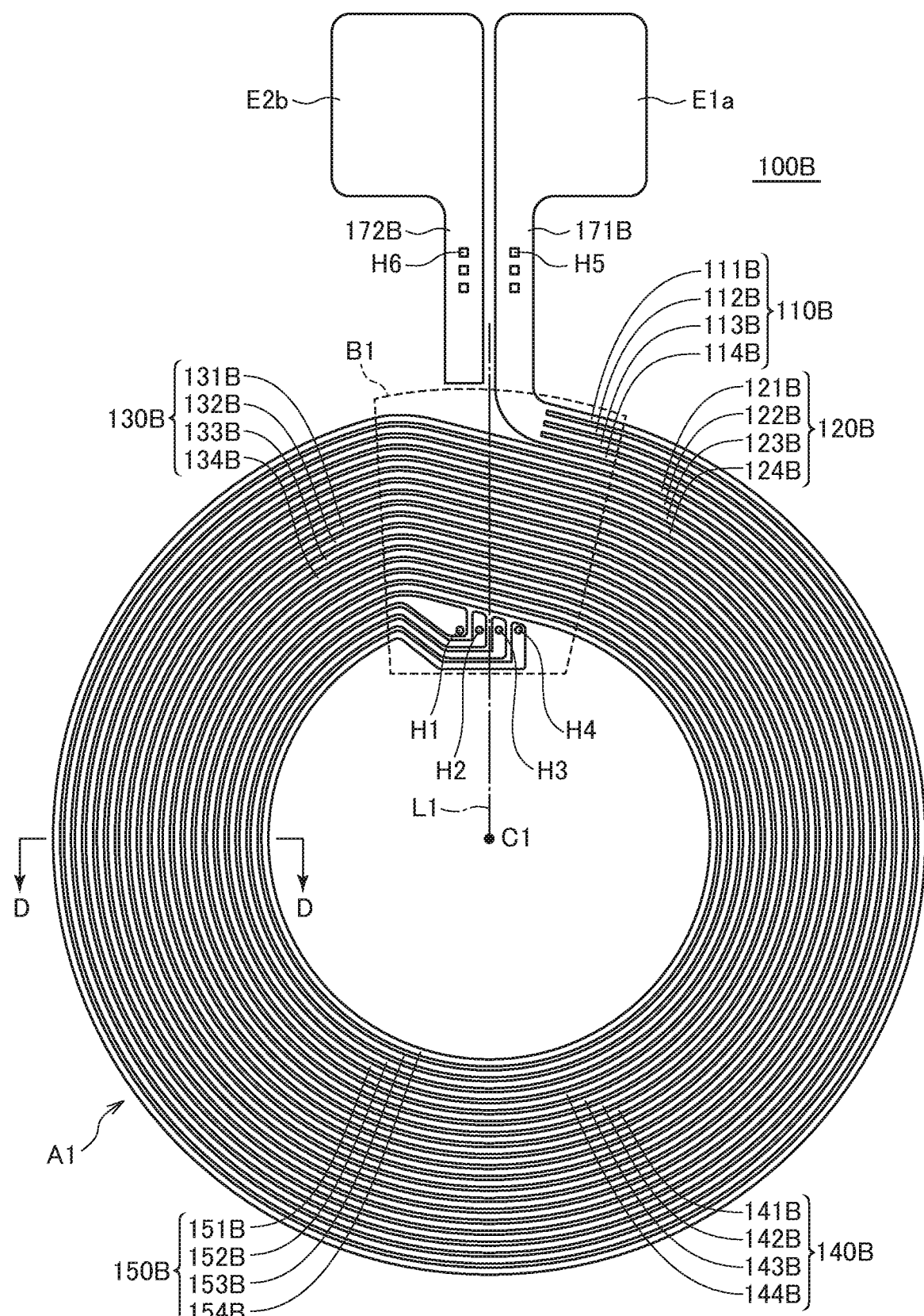
FIG. 21 is a schematic plan view for explaining the pattern shape of a coil pattern 100B constituting a coil unit U1.
Figure 22:
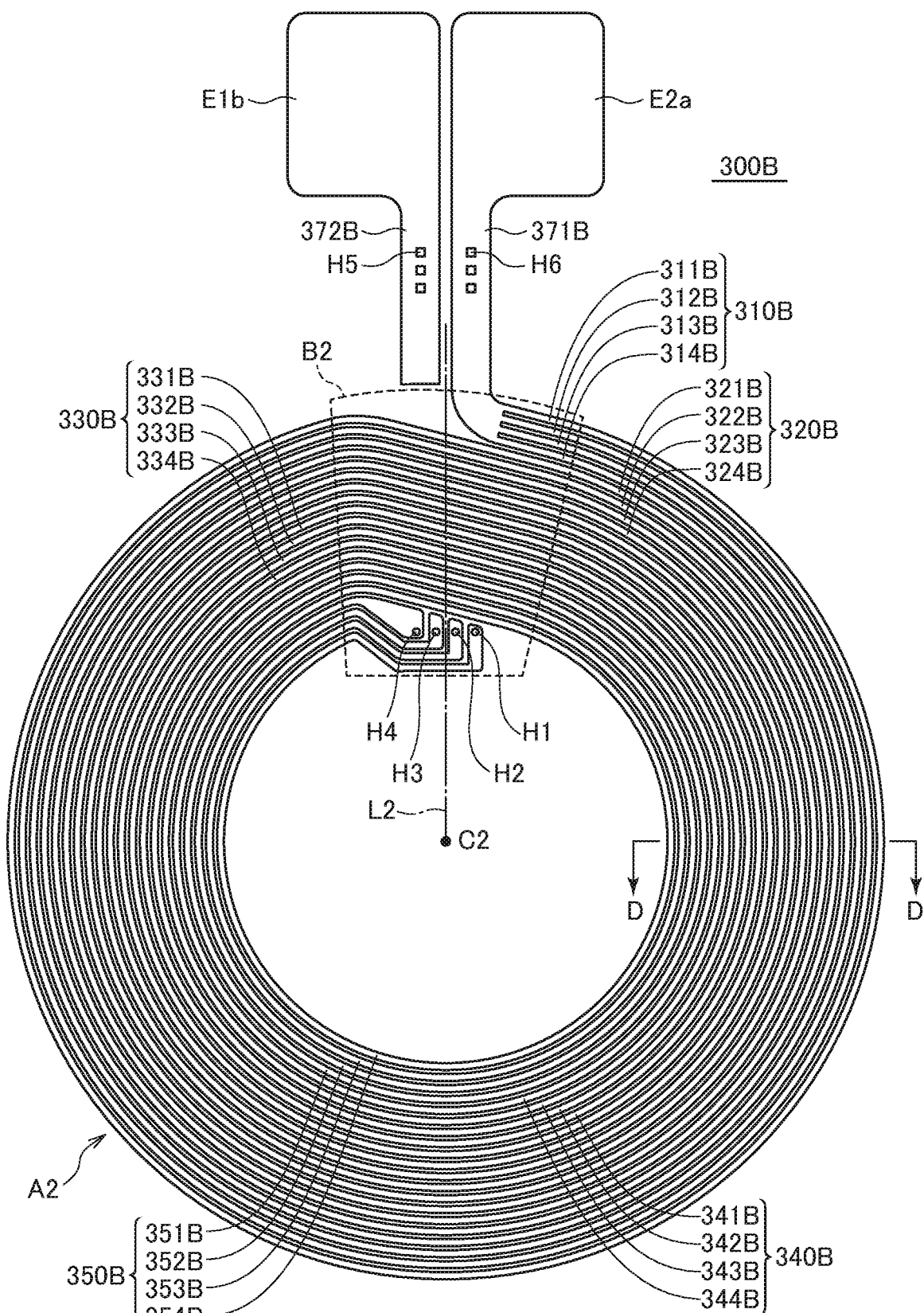
FIG. 22 is a schematic plan view for explaining the pattern shape of a coil pattern 300B constituting a coil unit U1.

FIGS. 21 and 22 are schematic plan views for explaining the pattern shapes of the coil patterns 100B and 300B constituting the coil unit U1, respectively.

As illustrated in FIG. 21, the first coil pattern 100B is constituted of a planar conductor spirally wound in a plurality of turns. In the example of FIG. 21, the first coil pattern 100B has five turns including turns 110B, 120B, 130B, 140B, and 150B, in which the turns 110B and 150B constitute the outermost and innermost turns, respectively. The turns 110B, 120B, 130B, 140B, and 150B are each radially divided into four parts by three spiral-shaped slits. As a result, the turn 110B is divided into conductive patterns 111B to 114B, the turn 120B is divided into conductive patterns 121B to 124B, the turn 130B is divided into conductive patterns 131B to 134B, the turn 140B is divided into conductive patterns 141B to 144B, and the turn 150B is divided into conductive patterns 151B to 154B. Thus, when viewed in terms of the unit of the divided conductive patterns, the conductive pattern 111B constitutes the outermost turn, and the conductive pattern 154B constitutes the innermost turn.

The conductive patterns 111B to 114B of the turn 110B positioned at the outermost periphery are connected to the terminal electrode E1a through a radially extending lead-out pattern 171B. Further, a radially extending lead-out pattern 172B is provided peripherally adjacent to the lead-out pattern 171B, and the leading end portion thereof is connected to the terminal electrode E2b. The inner peripheral ends of the respective conductive patterns 151B to 154B of the turn 150B positioned at the innermost periphery are connected to the through hole conductors H1 to H4, respectively.

The turns 110B, 120B, 130B, 140B, and 150B constituting the first coil pattern 100B each have a circumference region A1 in which the radial position is not changed and a shift region B1 in which the radial position is shifted. The five turns including the turns 110B, 120B, 130B, 140B, and 150B are defined with the shift region B1 as a boundary. As illustrated in FIG. 21, in the present embodiment, both the outer peripheral end and inner peripheral end of the first coil pattern 100B are positioned within the shift region B1. Further, when a virtual line L1 radially extending from a center point C1 of the first coil pattern 100B and passing between the lead-out patterns 171B and 172B is drawn, the shift region B1 is positioned on the virtual line L1. Further, the through hole conductors H1 and H4 are positioned symmetrically with respect to the virtual line L1, and the through hole conductors H2 and H3 are positioned symmetrically with respect to the virtual line L1.

As illustrated in FIG. 22, the third coil pattern 300B is constituted of a planar conductor spirally wound in a plurality of turns. In the example of FIG. 22, the third coil pattern 300B has five turns including turns 310B, 320B, 330B, 340B, and 350B, in which the turns 310B and 350B constitute the outermost and innermost turns, respectively. The turns 310B, 320B, 330B, 340B, and 350B are each divided into four parts by three spiral-shaped slits. As a result, the turn 310B is divided into conductive patterns 311B to 314B, the turn 320B is divided into conductive patterns 321B to 324B, the turn 330B is divided into conductive patterns 331B to 334B, the turn 340B is divided into conductive patterns 341B to 344B, and the turn 350B is divided into conductive patterns 351B to 354B. Thus, when viewed in terms of the unit of the divided conductive patterns, the conductive pattern 311B constitutes the outermost turn, and the conductive pattern 354B constitutes the innermost turn.

The conductive patterns 311B to 314B of the turn 310B positioned at the outermost periphery are connected to a terminal electrode E2a through a radially extending lead-out pattern 371B. Further, a radially extending lead-out pattern 372B is provided peripherally adjacent to the lead-out pattern 371B, and the leading end portion thereof is connected to a terminal electrode E1b. The inner peripheral ends of the respective conductive patterns 351B to 354B of the turn 350B positioned at the innermost periphery are connected to the through hole conductors H4, H3, H2, and H1, respectively.

The turns 310B, 320B, 330B, 340B, and 350B constituting the third coil pattern 300B each have a circumference region A2 in which the radial position is not changed and a shift region B2 in which the radial position is shifted. The five turns including the 310B, 320B, 330B, 340B, and 350B are defined with the shift region B2 as a boundary. As illustrated in FIG. 22, in the present embodiment, both the outer peripheral end and inner peripheral end of the third coil pattern 300B are positioned within the shift region B2. Further, when a virtual line L2 radially extending from a center point C2 of the third coil pattern 300B and passing between the lead-out patterns 371B and 372B is drawn, the shift region B2 is positioned on the virtual line L2.

The thus configured first and third coil patterns 100B and 300B are formed on one surface 11B and the other surface 12B of the substrate 10B, respectively, such that the center points C1 and C2 thereof overlap each other and that the virtual lines L1 and L2 overlap each other. As a result, the terminal electrodes E1a and E1b overlap each other, and the terminal electrodes E2a and E2b overlap each other. The terminal electrodes E1a and E1b are short-circuited through a through hole conductor H5 connecting the lead-out patterns 171B and 372B and are used as a single terminal electrode E1. Similarly, the terminal electrodes E2a and E2b are short-circuited through a through hole conductor H6 connecting the lead-out patterns 172B and 371B and are used as a single terminal electrode E2.

Figure 23:
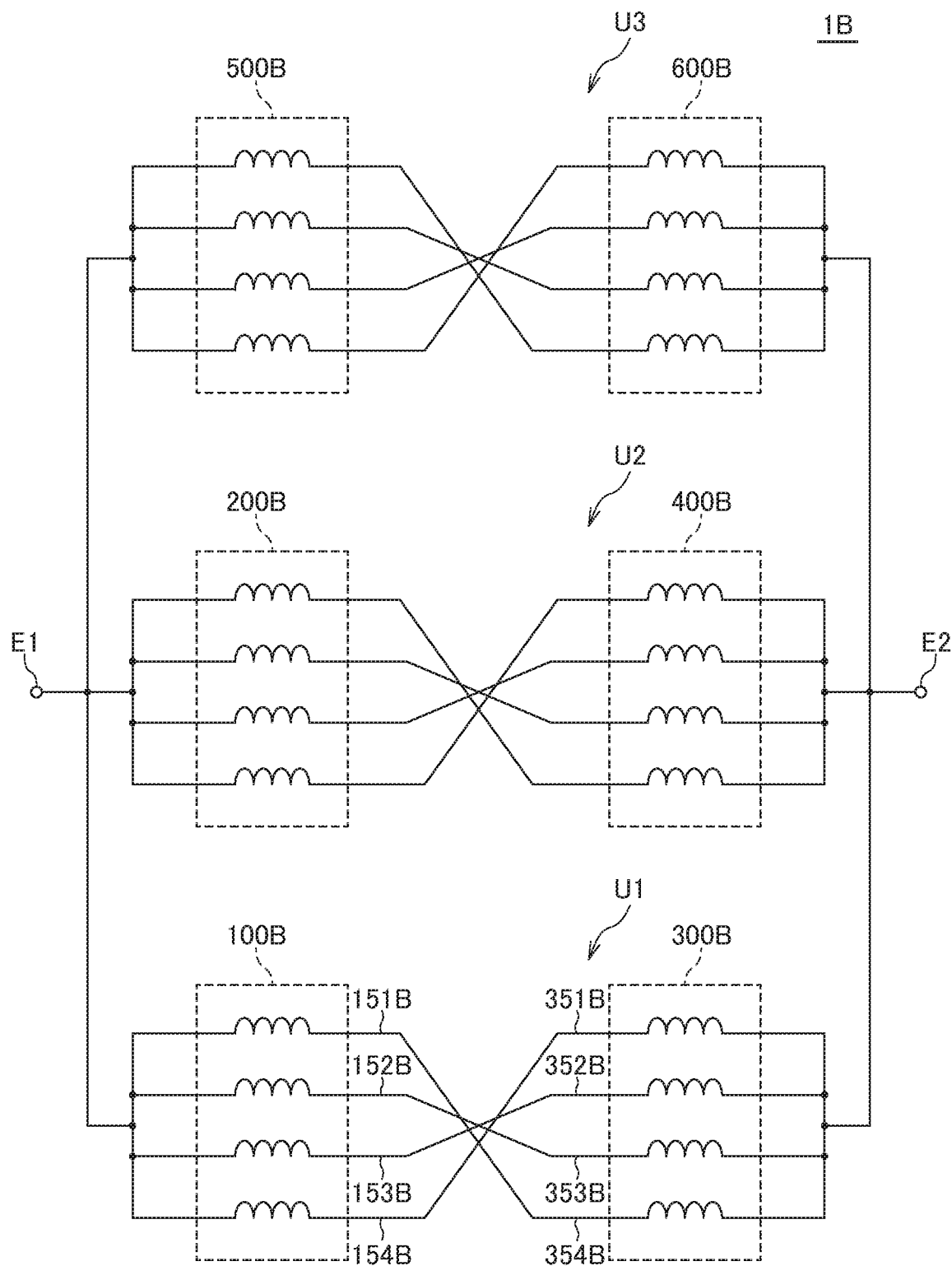
FIG. 23 is an equivalent circuit diagram of the coil component 1B.

Further, the conductive patterns 151B and 354B are short-circuited through the through hole conductor H1, the conductive patterns 152B and 353B are short-circuited through the through hole conductor H2, the conductive patterns 153B and 352B are short-circuited through the through hole conductor H3, and the conductive patterns 154B and 351B are short-circuited through the through hole conductor H4. Thus, as illustrated in FIG. 23, the first and third coil patterns 100B and 300B are connected in series to thereby form a spiral coil having 10 turns in total.

The coil units U2 and U3 each have the same configuration as the coil unit U1 except for the inner and outer diameters. That is, the coil patterns 200B and 400B constituting the coil unit U2 are also connected in series, and the coil patterns 500B and 600B constituting the coil unit U3 are also connected in series. Then, as illustrated in FIG. 23, the coil units U1 to U3 are connected in parallel. This makes it possible to flow current about three times as much as when only one coil unit is used.

The coil component 1B according to the present embodiment can be applied to the wireless power transmission system illustrated in FIG. 15.

In the wireless power transmission system illustrated in FIG. 15, the coil units U1 to U3 of the coil component 1B according to the present embodiment can be used as the feeding coil 51 or receiving coil 61. In this case, the magnetic sheet 53 disposed on the side opposite the space 40 across the feeding coil 51 and a magnetic sheet 63 disposed on the side opposite the space 40 across the receiving coil 61 correspond to the magnetic sheet 3 illustrated in FIG. 20. The existence of the magnetic sheets 53 and 63 (magnetic sheet 3) can enhance inductance of each of the feeding coil 51 and receiving coil (coil units U1 to U3), achieving more efficient power transmission.

On the other hand, however, the existence the magnetic sheet 3 generates a difference in impedance among the coil units U1 to U3 due to a difference in inductance corresponding to a distance from the magnetic sheet 3 even though the coil units U1 to U3 have the same number of turns. The existence of the difference in impedance among the coil units U1 to U3 may increase loss due to inhomogeneous current density distribution caused by the difference in impedance. As a result, when the coil units U1 to U3 of the coil component 1B are used as the feeding coil 51 or receiving coil 61 of the wireless power transmission system illustrated in FIG. 15, heat generation associated with power transmission may become large.

Considering this point, in the present embodiment, a difference in the line length is set among the coil units U1 to U3. That is, the line length of the coil unit U1 closest to the magnetic sheet 3 and thus having the largest impedance is made smaller than the line length of the coil unit U2 to reduce the inductance of the coil unit U1, and the line length of the coil unit U3 farthest from the magnetic sheet 3 and thus having the smallest impedance is made larger than the line length of the coil unit U2 to increase the inductance of the coil unit U3. This allows reduction in the inductance difference among the three coil units U1 to U3, so that inhomogeneous current density distribution caused by the difference in impedance is reduced and is ideally eliminated. As a result, it is possible to reduce losses in the entire circuit illustrated in FIG. 23.

In the present embodiment, the impedance of each of the coil units U1 to U3 is adjusted by the line length of the coil pattern, thereby allowing fine adjustment of the impedance. Thus, by designing the line length according to parameters such as the distance from the magnetic sheet 3 and the number of turns, it is possible to reliably reduce the impedance difference among the coil units U1 to U3.

Figure 24:
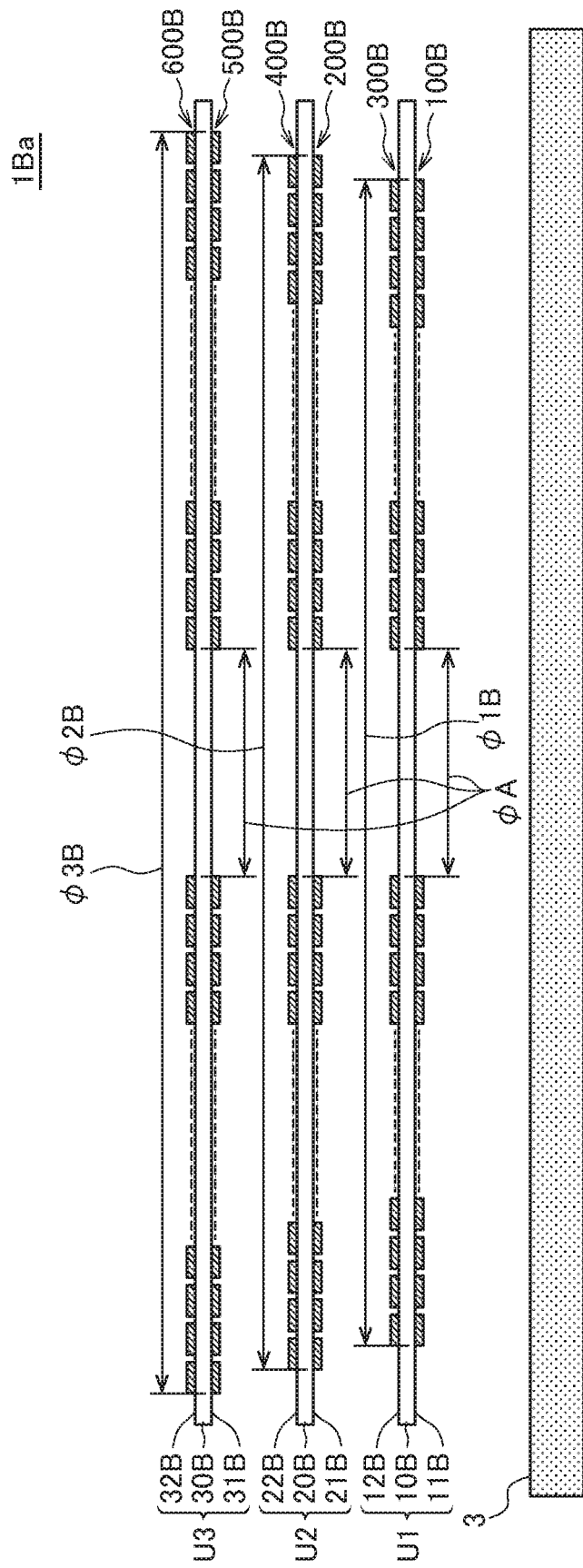
FIG. 24 is a schematic cross-sectional view for explaining the configuration of a coil component 1Ba according to a first modification of the third embodiment.

In the example of FIG. 20, both the inner and outer diameters are larger in the order of coil unit U3>coil unit U2>coil unit U1; however, this point is not essential in the present invention. Therefore, as in a coil component 1Ba according to a first modification illustrated in FIG. 24, the line length may be made larger in the order of coil unit U3>coil unit U2>coil unit U1 by making the inner diameters φA equal among the coil units U1 to U3 and making the relationship among the outer diameters of the coil units U1 to U3 satisfy

φ1B<φ2B<φ3B.

Figure 25:
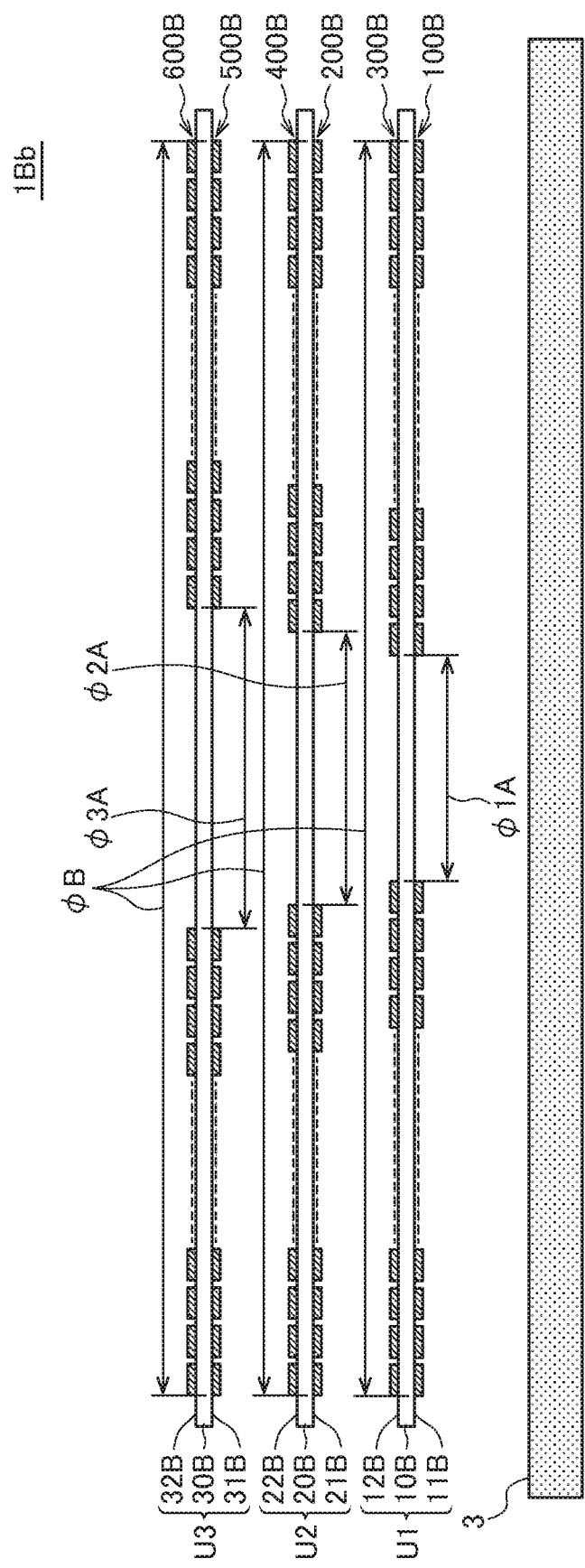
FIG. 25 is a schematic cross-sectional view for explaining the configuration of a coil component 1Bb according to a second modification of the third embodiment.

Alternatively, as in a coil component 1Bb according to a second modification illustrated in FIG. 25, the line length may be made larger in the order of coil unit U3>coil unit U2>coil unit U1 by making the outer diameters 4B equal among the coil units U1 to U3 and making the relationship among the inner diameters of the coil units U1 to U3 satisfy

φ1A<φ2A<φ3A.

Further alternatively, although not illustrated, in addition to or in place of making a difference in the inner or outer diameter among the coil units U1 to U3, the number of turns is made larger in the order of coil unit U3>coil unit U2>coil unit U1.

Figure 26:
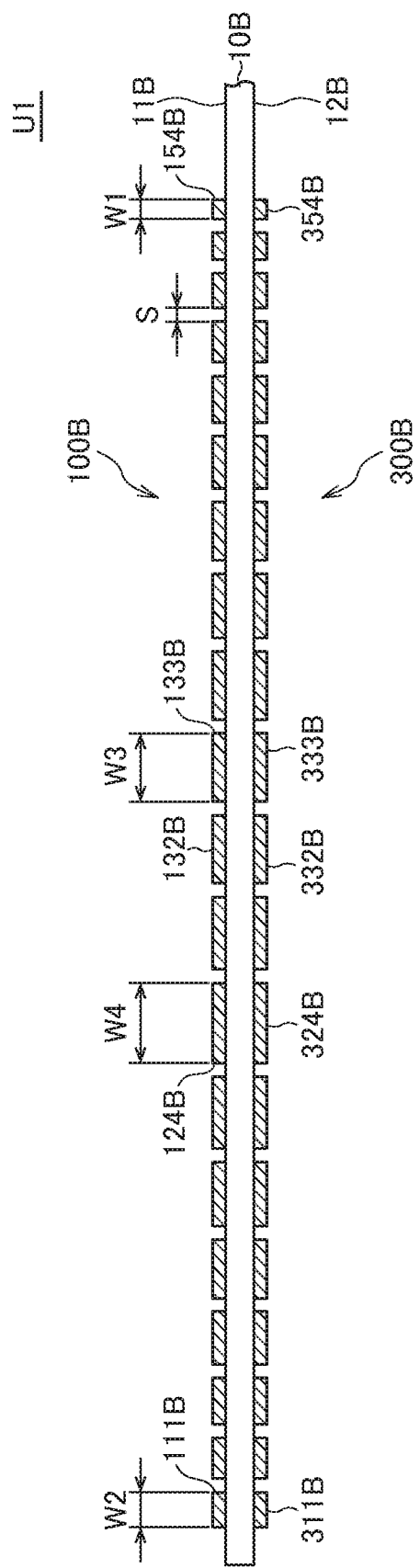
FIG. 26 is a schematic cross-sectional view taken along line D-D in FIGS. 21 and 22.

FIG. 26 is a schematic cross-sectional view taken along line D-D in FIGS. 21 and 22. The D-D cross section illustrated in FIGS. 21 and 22 corresponds to the cross section of the coil unit U1, and the cross section of each of the coil units U2 and U3 is the same as the D-D cross section illustrated in FIGS. 21 and 22 except for the inner or outer diameter.

Although not particularly limited, as illustrated in FIG. 26, the conductive patterns positioned in the circumference region A1 of the first coil pattern 100B and the conductive patterns positioned in the circumference region A2 of the third coil pattern 300B completely coincide in position with each other in a planar direction. This reduces the area of the substrate 10B that is covered with the conductive patterns in a plan view, making it possible to reduce eddy current loss. In addition, by making the conductive patterns positioned in the circumference region A1 and the conductive patterns positioned in the circumference region A2 overlap each other, it is possible to minimize visual interference between the first and third coil patterns 100B and 300B. That is, regardless of whether the substrate 10B is transparent or translucent, when the first coil pattern 100B is subjected to appearance inspection, the third coil pattern 300B does not become a visual obstacle and, conversely, when the third coil pattern 300B is subjected to appearance inspection, the first coil pattern 100B does not become a visual obstacle. This allows appearance inspection using an appearance inspection apparatus to be properly executed.

Further, although not particularly limited, as illustrated in FIG. 26, the coil component 1B according to the present embodiment has a feature in that the pattern width of each of the first and third coil patterns 100B and 300B is not constant. That is, the pattern width is smaller on the inner and outer peripheral sides and is larger on the center side.

More specifically, assuming that the pattern width of each of the conductive patterns 154B and 354B constituting the innermost turn is W1, the pattern width of each of the conductive patterns 111B and 311B constituting the outermost turn is W2, the pattern width of each of the conductive patterns 133B and 333B (or 132B and 332B) constituting the middle turn whose turn number counted from the innermost or outermost turn is intermediate among all the turns is W3, and the pattern width of each of the conductive patterns 124B and 324B located at the center position of the line length of the coil pattern along the conductive pattern is W4,

W1, W2<W3, W4 is satisfied.

The reason that the pattern widths W1 and W2 of the respective innermost and outermost turns are reduced is that the intensity of a magnetic field at these portions is strong, and thus a large loss is generated by heat generation caused due to eddy current. That is, by reducing the pattern widths W1 and W2 of the respective innermost and outermost turns, the amount of magnetic flux that interferes with the innermost and outermost turns is reduced, thereby making it possible to reduce the occurrence of eddy current. The pattern width W1 of the innermost turn is preferably larger than the pattern thickness of each of the coil patterns 100B and 300B. This allows eddy current flowing in the coil patterns 100B and 300B to concentrate on radially opposite sides of the conductive pattern, so that it is possible to obtain a remarkable loss reduction effect resulting from a reduction in the pattern width of each of the coil patterns 100B and 300B.

Further, the pattern thickness of the conductive pattern may be smaller in the innermost turn than in the outermost pattern. Particularly, the pattern thickness is preferably reduced gradually or stepwise from the outermost turn toward the innermost turn. With this configuration, loss reduction effect obtained by reducing the pattern width becomes remarkable on the inner peripheral side which is more strongly affected by eddy current.

In the coil component according to the present embodiment, each turn is radially divided into four parts by the spiral-shaped slits, so that inhomogeneous current density distribution is reduced as compared to a case where such slits are not formed. As a result, DC resistance and AC resistance can be reduced. Further, the radial position of the conductor part of the first coil pattern 100B and that of the conductor part of the third coil pattern 300B are completely interchanged with each other, thereby canceling a difference between dimensions of inner and outer peripheries. This homogenizes current density distribution, allowing further reduction in DC resistance and AC resistance.

Figure 27:
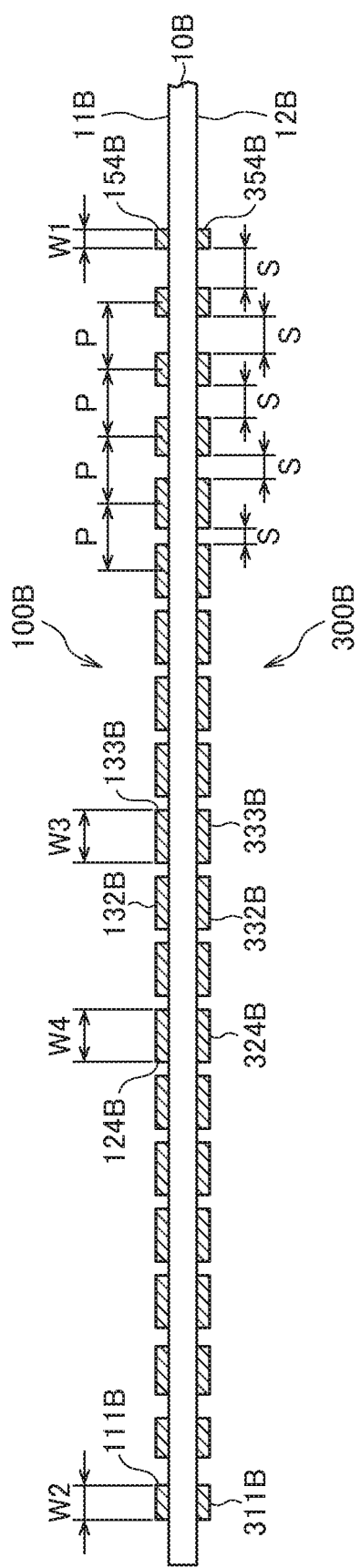
FIG. 27 is a schematic cross-sectional view of a coil unit according to a modification.

Further, in the example illustrated in FIG. 26, the dimension of a space S between radially adjacent turns is made constant. This prevents an unnecessary space from being generated in the vicinity of the inner or outer peripheral end where the pattern width is smaller, thereby ensuring a sufficient pattern width and thus reducing DC resistance. However, the dimension of the space S need not be made constant in the present invention, but may be varied according to the pattern width. In the example of FIG. 27, a radial pitch P between the adjacent conductive patterns is made constant, whereby the smaller the pattern width is, the larger the dimension of the space S becomes, and, conversely, the larger the pattern width is, the smaller the dimension of the space S becomes. With this configuration, it is possible to obtain the same inductance as when the pattern width is made constant.

Fourth Embodiment

Figure 28:
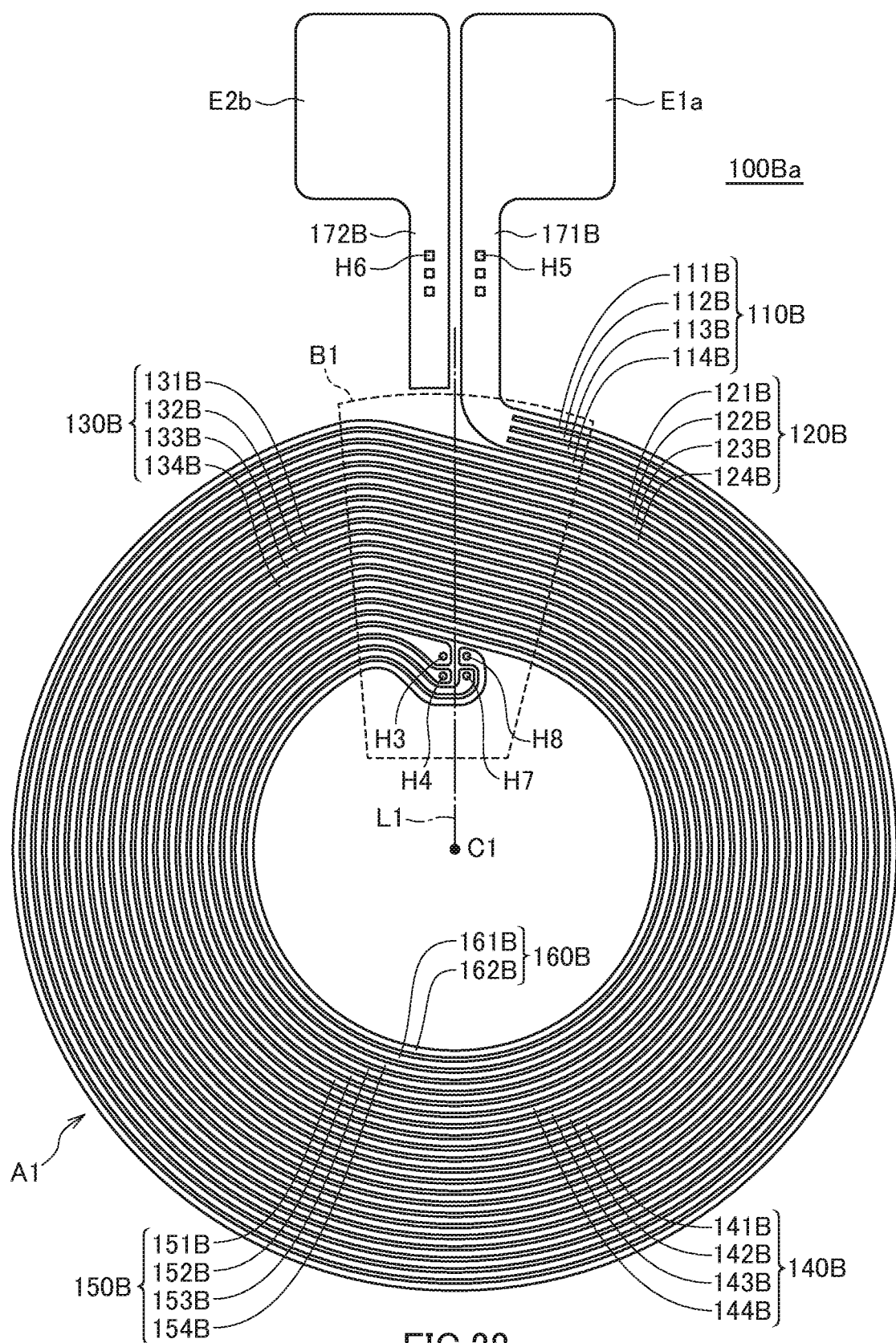
FIG. 28 is a schematic plan view for explaining the pattern shape of a first coil pattern 100Ba included in a coil component 2B according to a fourth embodiment of the present invention.
Figure 29:
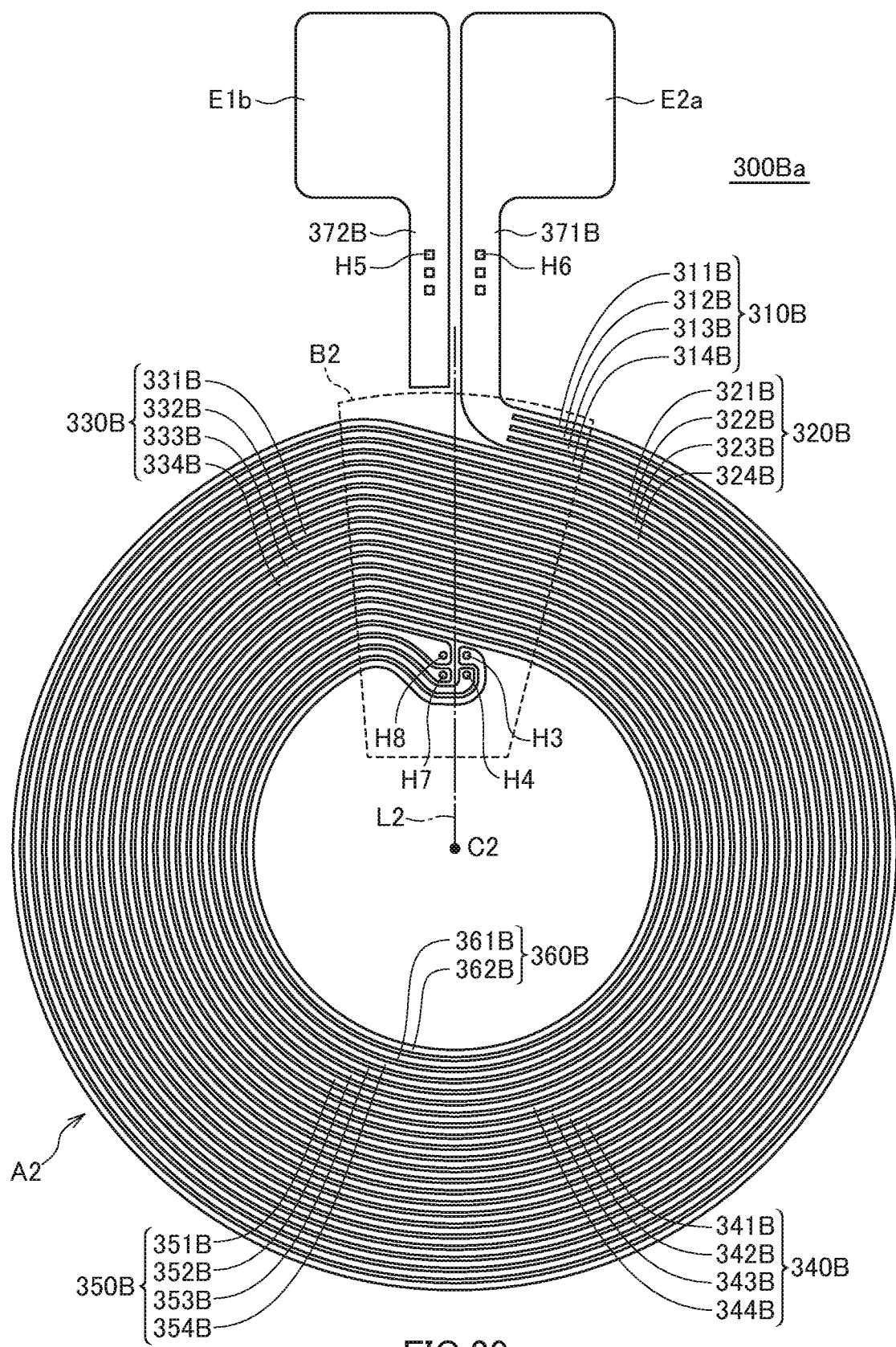
FIG. 29 is a schematic plan view for explaining the pattern shape of a third coil pattern 300Ba included in the coil component 2B according to the fourth embodiment of the present invention.

FIGS. 28 and 29 are schematic plan views for explaining the pattern shapes of a first coil pattern 100Ba and a third coil pattern 300Ba included in a coil component 2B according to a fourth embodiment of the present invention.

The first and third coil patterns 100Ba and 300Ba are used in place of the first and third coil patterns 100B and 300B illustrated in FIGS. 21 and 22 to constitute the coil unit U1 of the coil component 2B. The coil units U2 and U3 each have the same pattern as the coil unit U1 except for the inner and outer diameters.

As illustrated in FIG. 28, the first coil pattern 100Ba has a configuration obtained by adding conductive patterns 161B and 162B to the first coil pattern 100B illustrated in FIG. 21 and providing through hole conductors H7 and H8 at the inner peripheral ends of the respective conductive patterns 161B and 162B. The conductive pattern 161B is a conductive pattern of one turn continued from the conductive pattern 151B, and conductive pattern 162B is a conductive pattern of one turn continued from the conductive pattern 152B. In the present embodiment, the through hole conductor H3 and through hole conductor H8 are disposed symmetrically with respect to the virtual line L1, and the through hole conductor H4 and through hole conductor H7 are disposed symmetrically with respect to the virtual line L1. Other configurations are basically the same as those of the first coil pattern 100B illustrated in FIG. 21, so the same reference numerals are given to the same elements, and overlapping description will be omitted. A coil pattern 200Ba included in the coil unit U2 and a coil pattern 500Ba included in the coil unit U3 each have the same pattern shape as the first coil pattern 100Ba illustrated in FIG. 28 except for the inner and outer diameters.

As illustrated in FIG. 29, the third coil pattern 300Ba has a configuration obtained by adding conductive patterns 361B and 362B to the third coil pattern 300B illustrated in FIG. 22 and providing through hole conductors H4 and H3 at the inner peripheral ends of the respective conductive patterns 361B and 362B. The conductive pattern 361B is a conductive pattern of one turn continued from the conductive pattern 351B, and the conductive pattern 362B is a conductive pattern of one turn continued from the conductive pattern 352B. The inner peripheral ends of the respective conductive patterns 353B and 354B are connected to the through hole conductors H8 and H7, respectively. Other configurations are basically the same as those of the third coil pattern 300B illustrated in FIG. 22, so the same reference numerals are given to the same elements, and overlapping description will be omitted. A coil pattern 400Ba included in the coil unit U2 and a coil pattern 600Ba included in the coil unit U3 each have the same pattern shape as the third coil pattern 300Ba illustrated in FIG. 29 except for the inner and outer diameters.

Figure 30:
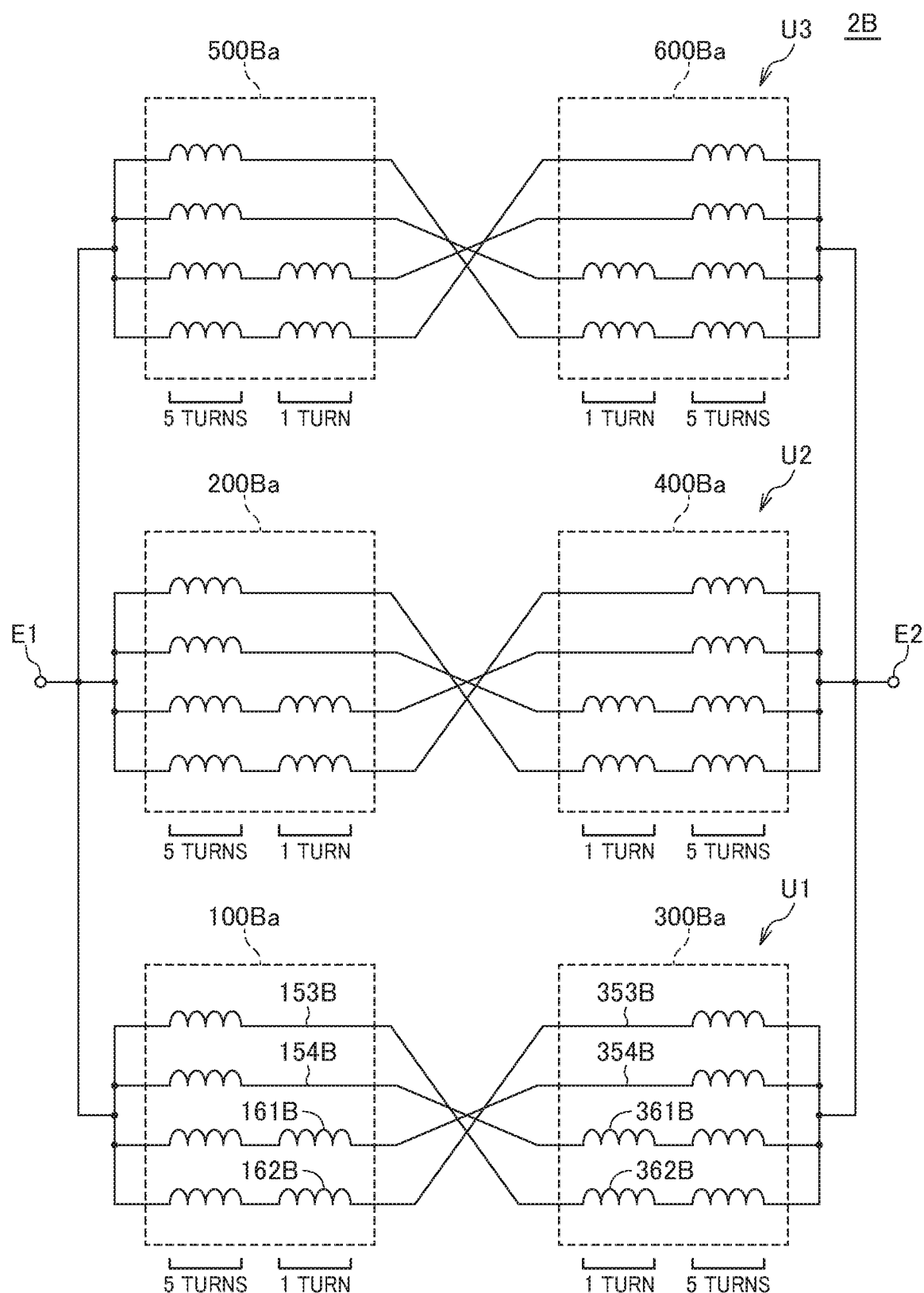
FIG. 30 is an equivalent circuit diagram of the coil component 2B.

The thus configured first and third coil patterns 100Ba and 300Ba are formed on one surface 11B and the other surface 12B of the substrate 10B, respectively, such that the center points C1 and C2 thereof overlap each other and that the virtual lines L1 and L2 overlap each other. As a result, the conductive patterns 153B and 362B are short-circuited through the through hole conductor H3, the conductive patterns 154B and 361B are short-circuited through the through hole conductor H4, the conductive patterns 161B and 354B are short-circuited through the through hole conductor H7, and the conductive patterns 162B and 353B are short-circuited through the through hole conductor H8. Thus, as illustrated in FIG. 30, the first and third coil patterns 100Ba and 300Ba are connected in series to thereby form a spiral coil having 11 turns in total.

As described above, in the present embodiment, it is possible to realize a spiral coil having an odd number of turns even though coil patterns on the front and back sides have the same pattern shape.

The coil units U2 and U3 each have the same configuration as the coil unit U1 except for the inner and outer diameters. That is, the coil patterns 200Ba and 400Ba constituting the coil unit U2 are also connected in series to form a spiral coil having 11 turns, and the coil patterns 500Ba and 600Ba constituting the coil unit U3 are also connected in series to form a spiral coil having 11 turns. Then, as illustrated in FIG. 30, the coil units U1 to U3 are connected in parallel. This makes it possible to flow current about three times as much as when only one coil unit is used.

While the preferred embodiments of the present invention have been described, the present invention is not limited to the above embodiments, and various modifications may be made within the scope of the present invention, and all such modifications are included in the present invention.

For example, in the above embodiments, the turns constituting the coil pattern are each divided into four parts by the spiral-shaped slits; however, this point is not essential in the present invention. Further, when each turn is to be divided into a plurality of conductive patterns, the number of conductive patterns is not limited to four.

Further, although the three coil units U1 to U3 are used in the third and fourth embodiments, the present invention is not limited to this, but it is sufficient to provide two or more parallel-connected coil units or coil patterns.

Further, although the two coil patterns formed on the front and back sides of the substrate are connected in series to form one coil unit in the above embodiments, the present invention is not limited to this, but it is sufficient that each coil unit includes at least one coil pattern.

EXAMPLES

Three coil components (Example 1, Example 2, and Comparative Example) each having the same structure (having five turns, and divided into four parts) as that of the coil component 1A according to the first embodiment were assumed, and the AC resistance and inductance of each of the above coil components when the resonance frequency was 100 kHz were calculated by simulations. The material of the conductive pattern was copper (Cu), and the pattern width, pattern thickness, and dimension of the space in each sample were set as illustrated in FIG. 31. In FIG. 31, turn 1 is the outermost turn, and turn 20 is the innermost turn. The inner diameter and outer diameter of the coil pattern were set to 10.285 mm and 23.63 mm, respectively.

The simulation results are illustrated in FIG. 32. As illustrated in FIG. 32, the AC resistance is smaller in Examples 1 and 2 than in Comparative Example. Particularly, the AC resistance in Example 1 is significantly improved as compared to Comparative Example. On the other hand, the inductance in Example 2 is equal to that in Comparative Example.

What is claimed is:

1. A coil component comprising:
   a substrate; and
   a first coil pattern formed on one surface of the substrate and spirally wound in a plurality of turns,
   wherein the plurality of turns include at least three turns that include an innermost turn positioned at an innermost periphery, an outermost turn positioned at an outermost periphery, and a middle turn whose turn number counted from the innermost or outermost turn is intermediate among all the turns,
   wherein the first coil pattern has a center position of a line length,
   wherein the first coil pattern is designed such that a pattern width at the center position is larger than pattern widths of the innermost and outermost turns,
   wherein the first coil pattern is designed such that a total or average value of pattern widths of turns positioned between the outermost turn and the middle turn is larger than a total or average value of pattern widths of turns positioned between the innermost turn and the middle turn,
   wherein each of the plurality of turns constituting the first coil pattern is constituted of a plurality of conductive patterns including first and second conductive patterns radially divided by a spiral-shaped slit,
   wherein the plurality of conductive patterns further include a third conductive pattern,
   wherein the first and second conductive patterns are radially divided by a first spiral-shaped slit, and
   wherein the second and third conductive patterns are radially divided by a second spiral-shaped slit.

2. The coil component as claimed in claim 1, wherein the pattern width at the center position is larger than the pattern width of the middle turn.

3. The coil component as claimed in claim 1, wherein the pattern width of the innermost turn is smaller than that of the outermost turn.

4. The coil component as claimed in claim 1, wherein a dimension of a space between radially adjacent turns is constant.

5. The coil component as claimed in claim 1, wherein a radial pitch between the plurality of turns is constant.

6. The coil component as claimed in claim 1, wherein the pattern width of the innermost turn is larger than a pattern thickness of the first coil pattern.

7. The coil component as claimed in claim 1, wherein a pattern thickness of the innermost turn is smaller than that of the outermost turn.

8. The coil component as claimed in claim 1, further comprising a second coil pattern formed on other surface of the substrate and spirally wound in a plurality of turns,
   wherein an inner peripheral end of the first coil pattern and that of the second coil pattern is connected to each other,
   wherein the second coil pattern has an innermost turn positioned at an innermost periphery, an outermost turn positioned at an outermost periphery, a middle turn whose turn number counted from the innermost or outermost turn is intermediate among all the turns, and a center position of a line length,
   wherein the second coil pattern is designed such that pattern width at the center position is larger than pattern widths of the respective innermost and outermost turns, and
   wherein the second coil pattern is designed such that a total or average value of pattern widths of turns positioned between the outermost turn and the middle turn is larger than a total or average value of pattern widths of turns positioned between the innermost turn and the middle turn.

9. The coil component as claimed in claim 8,
   wherein each of the plurality of turns constituting the second coil pattern is constituted of a plurality of conductive patterns including third and fourth conductive patterns radially divided by a spiral-shaped slit,
   wherein the first conductive pattern is positioned on an outer peripheral side relative to the second conductive pattern,
   wherein the third conductive pattern is positioned on an outer peripheral side relative to the fourth conductive pattern,
   wherein an inner peripheral end of the first conductive pattern and that of the fourth conductive pattern are connected to each other, and
   wherein an inner peripheral end of the second conductive pattern and that of the third conductive pattern are connected to each other.

10. The coil component as claimed in claim 1, further comprising a magnetic sheet disposed so as to overlap the first coil pattern in a plan view.

11. The coil component as claimed in claim 1, wherein the plurality of turns further include a first turn positioned between the innermost turn and the middle turn, and a second turn positioned between the outermost turn and the middle turn.

12. The coil component as claimed in claim 11, wherein the center position is located on the second turn.

13. The coil component as claimed in claim 1, wherein the first and second conductive patterns are connected to each other at an outer peripheral end of the first conductive pattern.

14. The coil component as claimed in claim 13, wherein the first and second conductive patterns are isolated from each other at an inner peripheral end of the first conductive pattern.

15. The coil component as claimed in claim 1, wherein the first and second conductive patterns of the innermost turn are different in pattern width from each other.

16. The coil component as claimed in claim 15, wherein the first and second conductive patterns of the outermost turn are different in pattern width from each other.

17. A wireless power transmission circuit comprising:
a coil component; and
a resonance circuit connected to the coil component,
wherein the coil component comprises:
    a substrate; and
    a first coil pattern formed on one surface of the substrate and spirally wound in a plurality of turns,
wherein the plurality of turns include at least three turns that include an innermost turn positioned at an innermost periphery, an outermost turn positioned at an outermost periphery, and a middle turn whose turn number counted from the innermost or outermost turn is intermediate among all the turns,
wherein the first coil pattern has a center position of a line length,
wherein the first coil pattern is designed such that a pattern width at the center position is larger than pattern widths of the innermost and outermost turns,
wherein the first coil pattern is designed such that a total or average value of pattern widths of turns positioned between the outermost turn and the middle turn is larger than a total or average value of pattern widths of turns positioned between the innermost turn and the middle turn,
wherein a pattern thickness of the first coil pattern is smaller than a skin depth of current flowing in the first coil pattern at a resonance frequency,
wherein each of the plurality of turns constituting the first coil pattern is constituted of a plurality of conductive patterns including first and second conductive patterns radially divided by a spiral-shaped slit,
wherein the plurality of conductive patterns further include a third conductive pattern,
wherein the first and second conductive patterns are radially divided by a first spiral-shaped slit, and
wherein the second and third conductive patterns are radially divided by a second spiral-shaped slit.

18. A coil component comprising:
a magnetic sheet; and
first and second coil patterns, each of the first and second coil patterns being spirally wound in a plurality of turns and disposed so as to overlap the magnetic sheet in a plan view,
wherein the first and second coil patterns are connected in parallel,
wherein the first coil pattern is disposed closer to the magnetic sheet than the second coil pattern,
wherein a line length of the second coil pattern is larger than that of the first coil pattern,
wherein each of the first and second coil patterns has an innermost turn positioned at an innermost periphery, an outermost turn positioned at an outermost periphery, a middle turn whose turn number counted from the innermost or outermost turn is intermediate among all the turns, and a center position of a line length,
wherein the first coil pattern is designed such that a pattern width at the center position is larger than pattern widths of the respective innermost and outermost turns,
wherein the first coil pattern is designed such that a total or average value of pattern widths of the turns positioned between the outermost turn and the middle turn is larger than a total or average value of the pattern widths of the turns positioned between the innermost turn and the middle turn,
wherein the second coil pattern is designed such that a pattern width at the center position is larger than pattern widths of the respective innermost and outermost turns,
wherein the second coil pattern is designed such that a total or average value of pattern widths of the turns positioned between the outermost turn and the middle turn is larger than a total or average value of the pattern widths of the turns positioned between the innermost turn and the middle turn, and
wherein an inner diameter of the second coil pattern is larger than that of the first coil pattern.

19. The coil component as claimed in claim 18, wherein an outer diameter of the second coil pattern is larger than that of the first coil pattern.

20. The coil component as claimed in claim 18, wherein number of turns of the first coil pattern and that of the second coil pattern are equal to each other.

21. The coil component as claimed in claim 18, wherein number of turns of the second coil pattern is larger than that of the first coil pattern.

22. The coil component as claimed in claim 18,
wherein the first coil pattern is designed such that the pattern width at the center position is larger than that of the middle turn, and
wherein the second coil pattern is designed such that the pattern width at the center position is larger than that of the middle turn.

23. The coil component as claimed in claim 18,
wherein the first coil pattern is designed such that the pattern width of the innermost turn is smaller than that of the outermost turn, and
wherein the second coil pattern is designed such that the pattern width of the innermost turn is smaller than that of the outermost turn.

24. The coil component as claimed in claim 18, further comprising first and second substrates disposed so as to overlap the magnetic sheet in a plan view,
wherein the first coil pattern is formed on one surface of the first substrate, and
wherein the second coil pattern is formed on one surface of the second substrate.

25. The coil component as claimed in claim 24, further comprising third and fourth coil patterns, each of the third and fourth coil patterns being wound in a plurality of turns,
wherein the third coil pattern is formed on other surface of the first substrate,
wherein the fourth coil pattern is formed on other surface of the second substrate,
wherein an inner peripheral end of the first coil pattern and that of the third coil pattern are connected to each other,
wherein an inner peripheral end of the second coil pattern and that of the fourth coil pattern are connected to each other, and
wherein a line length of the fourth coil pattern is larger than that of the third coil pattern.

26. The coil component as claimed in claim 25,
wherein each of the plurality of the turns constituting the first coil pattern is constituted of a plurality of conductive patterns including first and second conductive patterns radially divided by a spiral-shaped slit, and
wherein each of the plurality of the turns constituting the third coil pattern is constituted of a plurality of conductive patterns including third and fourth conductive patterns radially divided by a spiral-shaped slit.

27. The coil component as claimed in claim 26,
wherein the first conductive pattern is positioned on an outer peripheral side relative to the second conductive pattern,
wherein the third conductive pattern is positioned on an outer peripheral side relative to the fourth conductive pattern,
wherein an inner peripheral end of the first conductive pattern and that of the fourth conductive pattern are connected to each other, and
wherein an inner peripheral end of the second conductive pattern and that of the third conductive pattern are connected to each other.

28. The coil component as claimed in claim 18,
wherein the magnetic sheet has a flat surface, and
wherein the first and second coil patterns overlap the flat surface of the magnetic sheet as viewed from an axial direction of the first and second coil patterns.

29. The coil component as claimed in claim 18,
wherein the plurality of turns of the first coil pattern includes a first predetermined turn,
wherein the plurality of turns of the second coil pattern includes a second predetermined turn, and
wherein the first and second predetermined turns overlap each other.

30. The coil component as claimed in claim 29,
wherein first predetermined turn is an innermost turn of the first coil pattern, and
wherein second predetermined turn is an innermost turn of the second coil pattern.

31. The coil component as claimed in claim 29,
wherein first predetermined turn is an outermost turn of the first coil pattern, and
wherein second predetermined turn is an outermost turn of the second coil pattern.

32. The coil component as claimed in claim 18, further comprising a third coil pattern that is spirally wound in a plurality of turns and disposed so as to overlap the magnetic sheet in a plan view,
wherein the first, second, and third coil patterns are connected in parallel,
wherein the second coil pattern is disposed closer to the magnetic sheet than the third coil pattern,
wherein the line length of the third coil pattern is larger than that of the second coil pattern.

33. A coil component comprising:
a magnetic sheet; and
first and second coil patterns, each of the first and second coil patterns being spirally wound in a plurality of turns and disposed so as to overlap the magnetic sheet in a plan view;
third and fourth coil patterns, each of the third and fourth coil patterns being spirally wound in a plurality of turns; and
first and second substrates disposed so as to overlap the magnetic sheet in a plan view,
wherein the first and second coil patterns are connected in parallel,
wherein the first coil pattern is disposed closer to the magnetic sheet than the second coil pattern,
wherein a line length of the second coil pattern is larger than that of the first coil pattern,
wherein the first coil pattern is formed on one surface of the first substrate, and
wherein the second coil pattern is formed on one surface of the second substrate,
wherein the third coil pattern is formed on other surface of the first substrate,
wherein the fourth coil pattern is formed on other surface of the second substrate,
wherein an inner peripheral end of the first coil pattern and that of the third coil pattern are connected to each other,
wherein an inner peripheral end of the second coil pattern and that of the fourth coil pattern are connected to each other, and
wherein a line length of the fourth coil pattern is larger than that of the third coil pattern.

34. The coil component as claimed in claim 33, wherein an inner diameter of the second coil pattern is larger than that of the first coil pattern.

35. The coil component as claimed in claim 33, wherein an outer diameter of the second coil pattern is larger than that of the first coil pattern.

36. The coil component as claimed in claim 34, wherein number of turns of the first coil pattern and that of the second coil pattern are equal to each other.

37. The coil component as claimed in claim 33, wherein number of turns of the second coil pattern is larger than that of the first coil pattern.

38. The coil component as claimed in claim 33,
wherein each of the plurality of the turns constituting the first coil pattern is constituted of a plurality of conductive patterns including first and second conductive patterns radially divided by a spiral-shaped slit, and
wherein each of the plurality of the turns constituting the third coil pattern is constituted of a plurality of conductive patterns including third and fourth conductive patterns radially divided by a spiral-shaped slit.

39. The coil component as claimed in claim 38,
wherein the first conductive pattern is positioned on an outer peripheral side relative to the second conductive pattern,
wherein the third conductive pattern is positioned on an outer peripheral side relative to the fourth conductive pattern,
wherein an inner peripheral end of the first conductive pattern and that of the fourth conductive pattern are connected to each other, and
wherein an inner peripheral end of the second conductive pattern and that of the third conductive pattern are connected to each other.

40. The coil component as claimed in claim 33,
wherein the magnetic sheet has a flat surface, and
wherein the first and second coil patterns overlap the flat surface of the magnetic sheet as viewed from an axial direction of the first and second coil patterns.

41. The coil component as claimed in claim 33,
wherein the plurality of turns of the first coil pattern includes a first predetermined turn,
wherein the plurality of turns of the second coil pattern includes a second predetermined turn, and
wherein the first and second predetermined turns overlap each other.

42. The coil component as claimed in claim 41,
wherein first predetermined turn is an innermost turn of the first coil pattern, and
wherein second predetermined turn is an innermost turn of the second coil pattern.

43. The coil component as claimed in claim 41,
wherein first predetermined turn is an outermost turn of the first coil pattern, and
wherein second predetermined turn is an outermost turn of the second coil pattern.

44. The coil component as claimed in claim 33, further comprising a third coil pattern that is spirally wound in a plurality of turns and disposed so as to overlap the magnetic sheet in a plan view,
wherein the first, second, and third coil patterns are connected in parallel,
wherein the second coil pattern is disposed closer to the magnetic sheet than the third coil pattern, and
wherein the line length of the third coil pattern is larger than that of the second coil pattern.

45. A coil component comprising:
a magnetic sheet; and
first and second coil patterns, each of the first and second coil patterns being spirally wound in a plurality of turns and disposed so as to overlap the magnetic sheet in a plan view,
wherein the first and second coil patterns are connected in parallel,
wherein the first coil pattern is disposed closer to the magnetic sheet than the second coil pattern,
wherein a line length of the second coil pattern is larger than that of the first coil pattern,
wherein the plurality of turns of the first coil pattern includes a first predetermined turn,
wherein the plurality of turns of the second coil pattern includes a second predetermined turn, and
wherein the first and second predetermined turns overlap each other as viewed from an axial direction of the first and second coil patterns.

46. The coil component as claimed in claim 45, wherein an inner diameter of the second coil pattern is larger than that of the first coil pattern.

47. The coil component as claimed in claim 45, wherein an outer diameter of the second coil pattern is larger than that of the first coil pattern.

48. The coil component as claimed in claim 46, wherein number of turns of the first coil pattern and that of the second coil pattern are equal to each other.

49. The coil component as claimed in claim 45, wherein number of turns of the second coil pattern is larger than that of the first coil pattern.

50. The coil component as claimed in claim 45, further comprising first and second substrates disposed so as to overlap the magnetic sheet in a plan view,
wherein the first coil pattern is formed on one surface of the first substrate, and
wherein the second coil pattern is formed on one surface of the second substrate.

51. The coil component as claimed in claim 45,
wherein the magnetic sheet has a flat surface, and
wherein the first and second coil patterns overlap the flat surface of the magnetic sheet as viewed from an axial direction of the first and second coil patterns.

52. The coil component as claimed in claim 45,
wherein first predetermined turn is an innermost turn of the first coil pattern, and
wherein second predetermined turn is an innermost turn of the second coil pattern.

53. The coil component as claimed in claim 45,
wherein first predetermined turn is an outermost turn of the first coil pattern, and
wherein second predetermined turn is an outermost turn of the second coil pattern.

54. The coil component as claimed in claim 45, further comprising a third coil pattern that is spirally wound in a plurality of turns and disposed so as to overlap the magnetic sheet in a plan view,
wherein the first, second, and third coil patterns are connected in parallel,
wherein the second coil pattern is disposed closer to the magnetic sheet than the third coil pattern, and
wherein a line length of the third coil pattern is larger than that of the second coil pattern.

* * * * *